United States Patent
Yoshioka et al.

(10) Patent No.: US 12,117,713 B2
(45) Date of Patent: Oct. 15, 2024

(54) NONLINEAR ON-CHIP OPTICAL DEVICES USING AlScN

(71) Applicant: The Trustees of the University of Pennsylvania, Philadelphia, PA (US)

(72) Inventors: Valerie J. Yoshioka, Philadelphia, PA (US); Jian Lu, Wynnewood, PA (US); Zichen Tang, Philadelphia, PA (US); Jicheng Jin, Philadelphia, PA (US); Roy H. Olsson, III, Philadelphia, PA (US); Bo Zhen, Merion Station, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 17/877,120

(22) Filed: Jul. 29, 2022

(65) Prior Publication Data

US 2023/0084321 A1    Mar. 16, 2023

Related U.S. Application Data

(60) Provisional application No. 63/227,501, filed on Jul. 30, 2021.

(51) Int. Cl.
*G02F 1/355* (2006.01)
*G02F 1/35* (2006.01)

(52) U.S. Cl.
CPC ............ *G02F 1/3556* (2013.01); *G02F 1/353* (2013.01)

(58) Field of Classification Search
CPC ................................ G02F 1/353; G02F 1/3556
See application file for complete search history.

(56) References Cited

U.S. PATENT DOCUMENTS

| | | | | |
|---|---|---|---|---|
| 8,144,391 B2 * | 3/2012 | Kusukame | ............ | G02F 1/3551 |
| | | | | 359/332 |
| 11,644,735 B2 * | 5/2023 | Tadanaga | ................ | G02F 1/377 |
| | | | | 385/122 |

FOREIGN PATENT DOCUMENTS

| JP | 07244310 A * | 9/1995 | ........... G02F 1/3551 |
|---|---|---|---|
| JP | 6632644 B2 * | 1/2020 | ......... B29D 11/0074 |
| WO | WO-2023022768 A2 * | 2/2023 | ............. H01L 21/02 |

OTHER PUBLICATIONS

Akiyama, et al., "Enhancement of piezoelectric response in scandium aluminum nitride alloy thin films prepared by dual reactive cosputtering", Advanced Materials, vol. 21, Issue 5, 2009, pp. 593-596.
Baeumler et al., "Optical constants and band gap of wurtzite AlxSCxN/Al2O3 prepared by magnetron sputter epitaxy for scandium concentrations up to x=0.41", Journal of Applied Physics, 2019, vol. 126 (45715), p. 12.
Boyd, "Nonlinear Optics, 3rd ed.", Academic Press, 1992.
Bruch et al., "On-chip X(2) microring optical parametric oscillator", Optica, vol. 6 No. 10, 2019, pp. 1361-1366.
(Continued)

*Primary Examiner* — Daniel Petkovsek
(74) *Attorney, Agent, or Firm* — BakerHostetler

(57) ABSTRACT

Nonlinear on-chip optical devices using AlScN are described herein. In one aspect, an optical component having nonlinear characteristics can include a first substrate defining a refractive index; and a nonlinear layer, the nonlinear layer disposed on the first substrate, the nonlinear layer comprising an amount of scandium (Sc), and the nonlinear layer defining a refractive index that is higher than the refractive index of the first substrate.

26 Claims, 17 Drawing Sheets
(15 of 17 Drawing Sheet(s) Filed in Color)

(56) References Cited

OTHER PUBLICATIONS

Cariou et al., "Low temperature plasma enhanced CVD epitaxial growth of silicon on GaAs: a new paradigm for III-V/S integration", Scientific Reports, 2016, vol. 6, 25674.

Chang et al., "Heterogeneous integration of lithium niobate and silicon nitride waveguides for wafer-scale photonic integrated circuits on silicon", Opt. Lett., 2017, vol. 42, pp. 803-806.

Chang et al., "Heterogeneously Integrated GaAs Waveguides on Insulator for Efficient Frequency Conversion", Laser & Photonics Reviews, 2018, 12, 1800149.

Chen et al., "Ultra-efficient frequency conversion in quasi-phase-matched lithium niobate microrings", Optica, 2019, 6, pp. 1244-1245.

Deng et al., "Bandgap in Al-1-xScxN", Applied Physics Letters, 2013, 102, 112103.

Epping et al., "On-chip visible-to-infrared super-continuum generation with more than 495 THz spectral bandwidth", Opt. Express, vol. 23, 2015, pp. 19596-19604.

Fan et al., "Super-conducting cavity electro-optics: A platform for coherent photon conversion between superconducting and photonic circuits", Science Advances, 2018, vol. 4, p. 5.

Fathpour, "Heterogeneous nonlinear integrated photonics", IEEE Journal of Quantum Electronics, 2018, vol. 54, pp. 1-16.

Fichtner et al., "Identifying and overcoming the interface originating C-axis in-stability in highly Sc enhanced AlN for piezoelectric micro-electromechanical systems", Journal of Applied Physics, 2017, vol. 122, 35301.

Fujii et al., "Nonlinear optical susceptibilities of AlN film", Applied Physics Letters, 1977, vol. 31, pp. 815-816.

Guo et al., "Parametric down-conversion photon-pair source on a nanophotonic chip", Light: Science & Applications 6, 2017, e16249-e16249.

Hickstein et al., "Ultrabroadband supercontinuum generation and frequency-comb stabilization using on-chip waveguides with both cubic and quadratic nonlinearities", Phys. Rev. Applied 8, 2017, 014025.

Kiehne et al., "Optical second-harmonic generation in sputter-deposited AlN films", Journal of Applied Physics, 1998, vol. 84, pp. 5922-5927.

Kumar, "Quantum frequency conversion", Optics Letter, 1990, vol. 15, No. 24, pp. 1476-1478.

Langrock et al., "All-optical signal processing using X(2) nonlinearities in guided-wave devices", Journal of Lightwave Technology, 2006, vol. 24, pp. 2579-2592.

Larciprete et al., "Blue second harmonic generation from aluminum nitride films deposited onto silicon by sputtering technique", Journal of Applied Physics, 2006, vol. 100, 023507.

Leuthold et al., "Nonlinear silicon photonics", Nature Photonics, 2010, vol. 4, pp. 535-544.

Lifante, "Integrated Photonics: Fundamentals", John Wiley & Sons, Ltd., 2003.

Lu et al., "Periodically poled thin-film lithium niobate microring resonators with a second-harmonic generation efficiency of 250,000%/W", Optica, 2019, vol. 6, pp. 1455-1460.

Luo et al., "On-chip second-harmonic generation and broadband parametric down-conversion in a lithium niobate microresonator", Opt. Express, 2017, vol. 25, pp. 24531-24539.

McKenna et al., "Cryogenic microwave-to-optical conversion using a triply resonant lithium-niobate-on-sapphire transducer", Optica, vol. 7, 2020, pp. 1737-1745.

Miller et al., "On-chip frequency comb geimneration at visible wavelengths via simultaneous second- and third-order optical nonlinearities", Opt. Express, vol. 22, 2014, pp. 26517-26525.

Montesinos-Ballester et al., "On-Chip Mid-Infrared Supercontinuum Generation from 3 to 13pm Wavelength", ACS Photonics, vol. 7, 2020, pp. 3423-3429.

Phillips et al., "Supercontinuum generation in quasi-phase-matched LiNbO3 waveguide pumped by a Tm-doped fiber laser system", Opt. Lett., 2011, vol. 36, pp. 3912-3914.

Roland et al., "Near-infrared gallium nitride two-dimensional photonic crystal platform on silicon", Applied Physics Letters, 2014, vol. 105, 11104.

Saleh et al., "Fundamentals of Photonics, 3rd ed.", (John Wiley & Sons), 1991, Chap. 22.

Sanford et al., "Measurement of second order susceptibilities of GaN and AlGaN", Journal of Applied Physics, 2005, vol. 97, 053512.

Shoji et al., "Absolute scale of second-order nonlinear-optical coefficients", J. Opt. Soc. Am. B, 1997, vol. 14, pp. 2268-2294.

Singh et al., "Quantum frequency conversion of a quantum dot single-photon source on a nanophotonic chip", Optica, 2019, vol. 6, pp. 563-569.

Thylen et al., "Integrated Photonics in the 21st Century", Photon. Res., 2014, vol. 2, pp. 75-81.

Trivino et al., "Integrated photonics on silicon with wide bandgap GaN semiconductor", Applied Physics Letters, 2013, vol. 102, 81120.

Wang et al., "Ferroelectric switching in sub-20 nm aluminum scandium nitride thin films", IEEE Electron Device Letters, 2020, vol. 41, pp. 1774-1777.

Wang et al., "Integrated lithium niobate electro-optic modulators operating at CMOS-compatible voltages", Nature, 2018, vol. 562, pp. 101-104.

Wang et al., "Sub-Microsecond Polarization Switching in (Al,Sc)N Ferroelectric Capacitors Grown on Complementary Metal-Oxide-Semiconductor-Compatible Aluminum Electrodes", physica status solidi (RRL)—Rapid Research Letters, 2021, 2000575.

Wolf et al., "Cascaded second-order optical nonlinearities in on-chip micro rings", Opt. Express, 2017, vol. 25, pp. 29927-29933.

Wright et al., "Fabrication of periodically poled AlN with sub-micron periods", Physica Status Solidi c, 2011, vol. 8, pp. 2331-2333.

Xiang et al., "Single-photon frequency conversion via cascaded quadratic nonlinear processes", Phys. Rev. A, vol. 97, 2018, 063810.

Xiong et al., "Aluminum nitride as a new material for chip-scale optomechanics and nonlinear optics", New Journal of Physics, 2012, vol. 14, 095014.

Xiong et al., "Low-Loss, Silicon Integrated, Aluminum Nitride Photonic Circuits and Their Use for Electro-Optic Signal Processing," Nano Letters, 2012, vol. 12, pp. 3562-3568.

Yasuoka et al., "Effects of deposition conditions on the ferroelectric properties of (Al1-xSCx)N thin films", Journal of Applied Physics, 2020, vol. 128, 114103.

Zhu et al., "Integrated ScAlN Photonic Circuits on Silicon Substrate", in 2020 Conference on Lasers and Electro-Optics (CLEO), 2020.

* cited by examiner

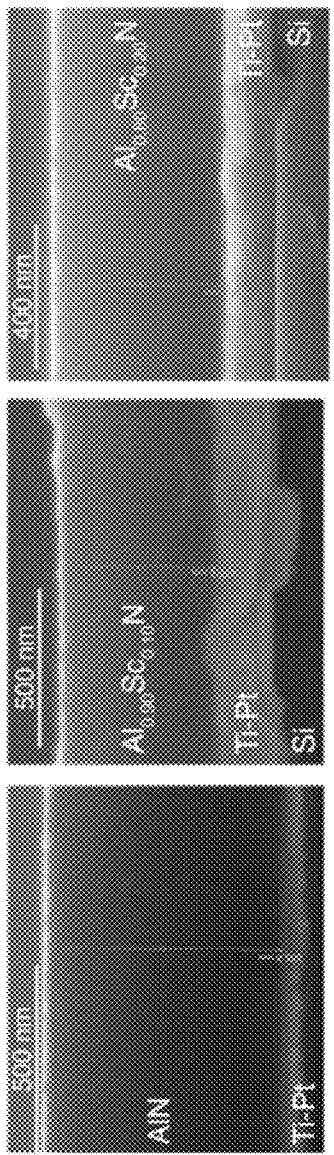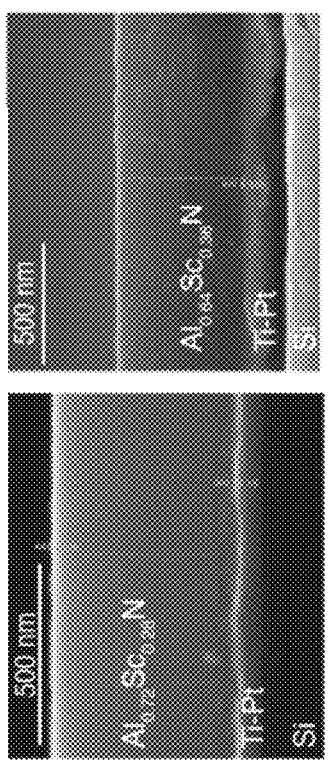

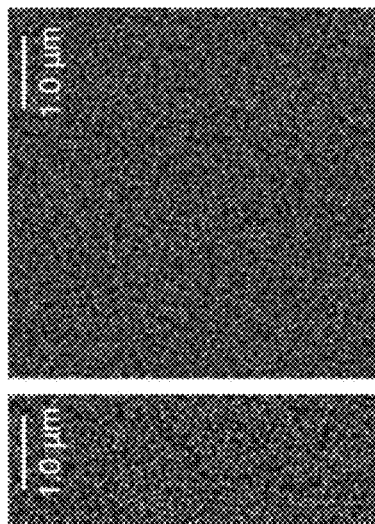
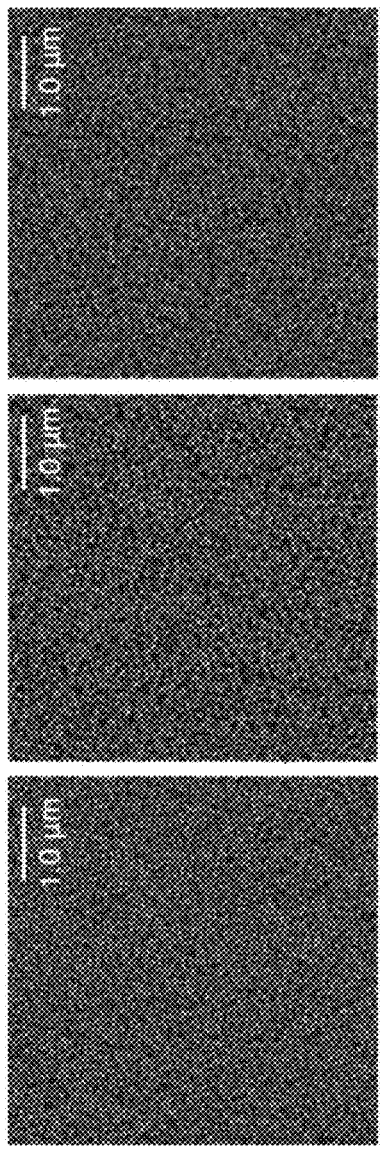
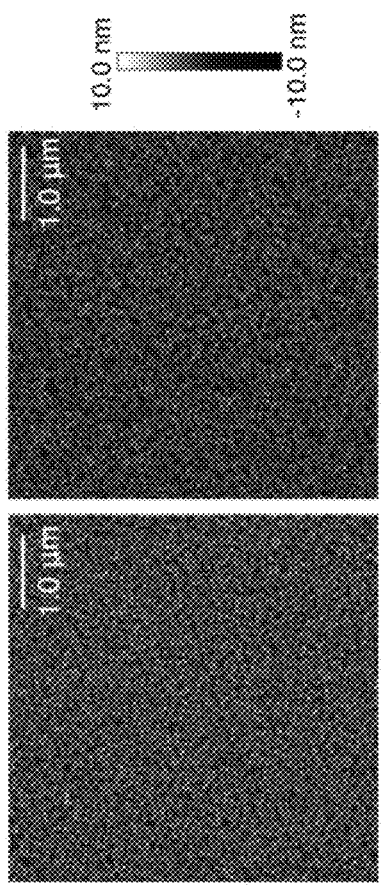
FIG. 9A  FIG. 9B  FIG. 9C  FIG. 9D  FIG. 9E

NONLINEAR ON-CHIP OPTICAL DEVICES USING AlScN

CROSS-REFERENCE TO RELATED APPLICATION

This application claims priority to and the benefit of U.S. Provisional Application No. 63/227,501, "Nonlinear On-Chip Optical Devices Using AlScN" (filed Jul. 30, 2021), the entirety of which application is incorporated by reference herein for any and all purposes.

GOVERNMENT RIGHTS

This invention was made with government support under 1944248 awarded by the National Science Foundation, W91 INF-19-1-0087 awarded by the United States Army and N00014-20-1-2325 awarded by the United States Navy. The government has certain rights in the invention.

TECHNICAL FIELD

The present disclosure relates to the field of nonlinear optical devices.

BACKGROUND

Nonlinear photonics is a growing industry that utilizes chip-sized devices to control and manipulate light signals for a variety of applications. Due to limitations of known nonlinear materials (e.g., the incompatibility of existing nonlinear materials with CMOS processing conditions), there are few options for affordable, large-scale production of efficient nonlinear photonic devices. Accordingly, there is a long-felt need in the art for new nonlinear materials that can be used in scalable fabrication processes.

SUMMARY

In meeting the described long-felt needs, the present disclosure provides an optical component having nonlinear characteristics, the optical component comprising: a first substrate defining a refractive index; and a nonlinear layer, the nonlinear layer disposed on the first substrate, the nonlinear layer comprising an amount of scandium (Sc) alloyed with aluminum nitride (AlN), and the nonlinear layer defining a refractive index that is higher than the refractive index of the first substrate.

Also provided are methods, comprising operating an optical component according to the present disclosure (e.g., according to any one of Aspects 1 to 25) so as to effect a signal from the optical component.

Further provided are methods, comprising fabricating an optical component according to the present disclosure (e.g., according to any one of Aspects 1 to 25), wherein the nonlinear layer is placed on the first substrate via vapor deposition.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document. In the drawings:

(FIG. 1B) Ring resonator with diameter d, evanescently coupled to a waveguide. Light can be coupled into this waveguide using grating or edge couplers. (FIG. 1C) Structure with additional buffer layer of silicon dioxide ($SiO_2$) and electrodes on top (signal in purple, ground in red). (FIG. 1D) Pattern of electrodes on top of ring resonator (signal in purple, ground in red). Electrodes can be directed to larger pads in order to interface between the device and large electrical controls.

(FIG. 2A) Cross-sectional scanning electron microscope (SEM) image of $Al_{0.64}Sc_{0.36}N$ film, with thickness of 485.6 nm shown in green. (FIG. 2B) atomic force microscopy (AFM) image of $Al_{0.64}Sc_{0.36}N$ film; no anomalously oriented grains are present. (FIGS. 8A-8E and 9A-9E provide SEM and AFM images of all samples.)

(FIG. 3A) SHG reflection geometry in crystal frame of reference. Sample thickness is t, refracted angle of SH light is $\theta_{2\omega}$, and polarization is labelled p and s. The SI-IG is p-polarized regardless of input polarization due to crystal symmetry. (FIG. 3B) SHG measurement apparatus. ND: neutral density filter, P: polarizer, L: lens, S: $Al_{1-x}Sc_xN$ sample, FM: flip mirror, F: filter, and PM: power meter. The SH signal is separated from fundamental light using a high-pass filter or a prism for spectra and power measurements respectively.

(FIG. 4A) SHG power dependence from p-polarized input. Black lines indicate quadratic power dependence fits for second-harmonic (SH) signal for each sample. From bottom to top, data from the 0% Se sample is indicated by blue circles, 10% by orange squares, 20% by yellow diamonds, 28% by purple triangles, and 36% by green crosses. (FIG. 4B) SH spectra from p-polarized input, similarly color coded by the Sc concentration. Samples with higher Sc concentration exhibit stronger SHG. The signal from the 0% Sc sample has been scaled by a factor of 10 for visibility.

FIGS. 8A-8E provide SEM images of (FIG. 8A) AlN, (FIG. 8B) $Al_{0.90}Sc_{0.10}N$, (FIG. 8C) $Al_{0.80}Sc_{0.20}N$, (FIG. 8D) $Al_{0.72}Sc_{0.28}N$, and (FIG. 8E) $Al_{0.64}Sc_{0.36}N$.

FIGS. 9A-9E provide AFM images of (FIG. 9A) AlN, (FIG. 9B) $Al_{0.90}Sc_{0.10}N$, (FIG. 9C) $Al_{0.80}Sc_{0.20}N$, (FIG. 9D) $Al_{0.72}Sc_{0.28}N$, and (FIG. 9E) $Al_{0.64}Sc_{0.36}N$. No anomalous grains are present. The vertical scale bar is the same for all images.

(FIG. 10A) Horizontally polarized (also known as quasi-TE or TE-like) first order mode. (FIG. 10B) Vertically polarized (also known as quasi-TM or TM-like) first order mode. (FIG. 10C) Horizontally polarized (also known as quasi-TE or TE-like) second order mode. (FIG. 10D) Vertically polarized (also known as quasi-TM or TM-like) second order mode.

(FIG. 11A) SiN on $Al_{0.80}Sc_{0.20}N$ on sapphire and (FIG. 11B) Amorphous silicon (α-Si) on $Al_{0.80}Sc_{0.20}N$ on sapphire. The effective index of the guided mode that uses SiN is 1.91, and waveguide dimensions are 2,000 nm by 200 nm. Due to the low index contrast between layers, light is poorly confined, and loss is high at 40.7 dB/cm. The effective index of the guided mode with α-Si is 1.92, and waveguide dimensions are 600 am by 150 nm. Due to the higher index contrast between layers, light is better confined even in a smaller waveguide; loss is lower at 6.2 dB/cm.

(FIG. 12A) SiN on $Al_{0.80}Sc_{0.20}N$ on sapphire and (FIG. 12B) α-Si on $Al_{0.80}Sc_{0.20}N$ on sapphire. For waveguides with SiN, the bend radius must be larger than 200 μm to avoid significant loss. For waveguides with α-Si, the bend radius can be much smaller, around 50 μm, with reasonable loss.

(FIG. 16B) simulated response of this MZI passive device based on Si on $Al_{0.80}Sc_{0.20}N$ on sapphire. The maximum transmission is reasonable at −26 dB.

(FIG. 17A) placing the optical waveguide between a signal (red) and ground (purple) electrode will induce an in-plane electric field. With the TM waveguide mode, the electro-optic response will utilize the $d_{31}$ component of second-order nonlinearity, which is smaller. (FIG. 17B) by placing the signal electrode over the waveguide with ground electrodes to the sides, an out-of-plane electric field can be induced. A low-index cladding such as $SiO_2$, indicated by the blue background, should be used between the optical waveguide and electrodes to reduce optical loss. With the TM waveguide mode, the electro-optic response will utilize the larger $d_{33}$ component of second-order nonlinearity.

DETAILED DESCRIPTION OF ILLUSTRATIVE EMBODIMENTS

Figure 1A:
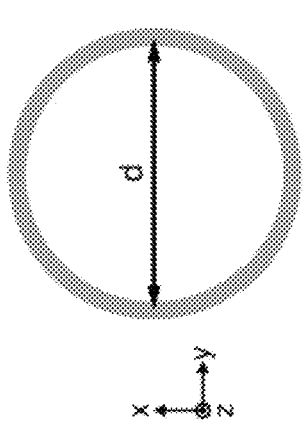
FIGS. 1A-1D provide an example FO modulator design, (FIG. 1A) Optical waveguide structure with labelled parameters t, w, and h.
Figure 1B:
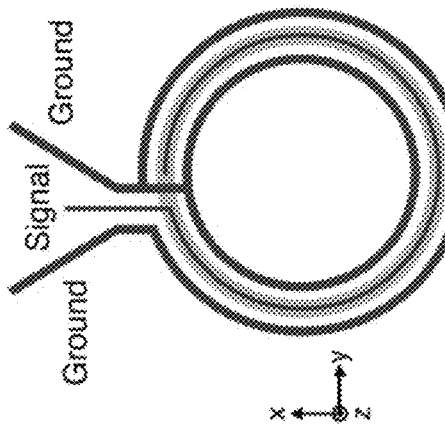
Figure 1C:
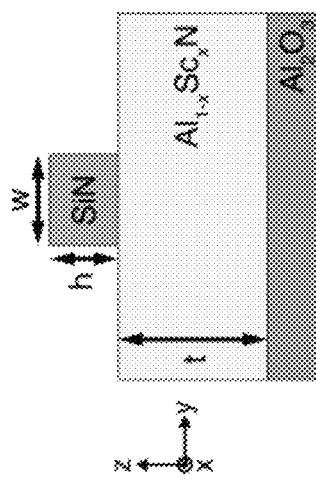
Figure 1D:
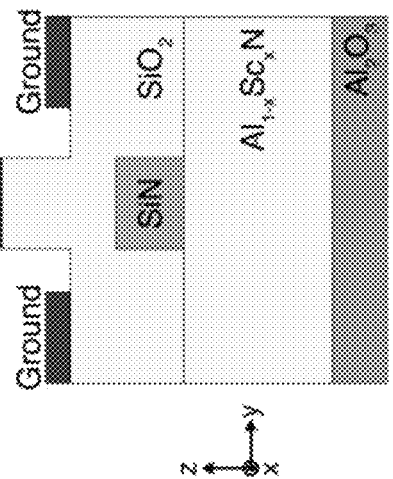

The present disclosure may be understood more readily by reference to the following detailed description of desired embodiments and the examples included therein.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of" The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently of the endpoints (e.g., "between 2 grams and 10 grams, and all the intermediate values includes 2 grams, 10 grams, and all intermediate values"). The endpoints of the ranges and any values disclosed herein are not limited to the precise range or value; they are sufficiently imprecise to include values approximating these ranges and/or values. All ranges are combinable.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4. Further, the term "comprising" should be understood as having its open-ended meaning of "including," but the term also includes the closed meaning of the term "consisting." For example, a composition that comprises components A and B may be a composition that includes A, B, and other components, but may also be a composition made of A and B only. Any documents cited herein are incorporated by reference in their entireties for any and all purposes.

The second-order optical susceptibility ($\chi^{(2)}$) of AlScN alloy thin films is measured and discovered that $\chi^{(2)}$ is drastically enhanced with Sc concentration. Based on these results, AlScN is a new, strongly nonlinear material that can facilitate production of nonlinear photonic devices. AlScN (also written as $Al_{1-x}Sc_xN$, ScAlN, and $Sc_xAl_{1-x}N$) can be implemented with a variety of nonlinear on-chip optical or optoelectronic devices as the nonlinear material, regardless of Whether the nonlinear on-chip optical or optoelectronic devices use a second-order or higher-order process. Third-harmonic generation (THG) signals were also observed, indicating nonzero $\chi^{(3)}$ values. Furthermore, because cascaded second-order processes act as effective third-order processes, higher-order nonlinear processes can also be applied. Example nonlinear devices include (but are not limited to) frequency converters, multiple wavelength sources, and modulators.

For AlN thin films without Sc, one component of susceptibility $d_{33}$ was measured to be 3.6±0.4 pm/V. (For historical reasons, nonlinear values are often reported as d values rather than $\chi^{(2)}$ values, with $d=\chi^{(2)}/2$ we will use d values for consistency). In an AlScN sample with 28% Sc, $d_{33}$ is enhanced up to 27.7±1.8 pm/V. Even at lower concentrations of Sc, both $d_{33}$ and the smaller component, $d_{31}$, are still enhanced compared to AlN films, as shown in Table 1.

Intergrated frequency converters include any on-chip element that converts light of one frequency to another frequency. Second-order processes include second harmonic generation (SHG), sum frequency generation (SFG), difference frequency generation (DM), optical parametric oscillation (OPO), optical parametric amplification (OPA), and spontaneous parametric down conversion (SPDC).

TABLE 1

Measured $\chi^{(2)}$ values for each sample with different percentages of Sc concentration, where $d_{33} = \chi_{zzz}^{(2)}/2$ and $d_{31} = \chi_{zxx}^{(2)}/2$.

| Sc % | $d_{33}$ (pm/V) | $d_{31}$ (pm/V) |
|---|---|---|
| 0 | 3.6 ± 0.4 | 0.06 ± 0.005 |
| 10 | 8.8 ± 0.6 | 0.69 ± 0.04 |
| 20 | 20.2 ± 1.3 | 2.1 ± 0.1 |
| 28 | 27.7 ± 1.8 | 2.6 ± 0.1 |
| 36 | 18.9 ± 1.3 | 4.2 ± 0.3 |

The electro-optic effect can also be considered as a second-order nonlinear optical process that mixes microwave and optical frequencies. Third-order processes result in frequency conversion via four wave mixing (FWM) and often provide smaller frequency shifts cascaded second-order processes can lead to effective third-order processes as well. Furthermore, processes such as stimulated Raman scattering (SRS) can also be considered as a nonlinear interaction that results in frequency conversion, as the nonlinear interaction between light photons and vibrational phonons results in output light at shifted frequencies. While most devices currently convert classical light signals, quantum frequency converters (QFC) convert single photons. Quantum transduction is a special case of QFC as it converts between microwave signals and optical frequencies. For examples of frequency converters, see:

AlN ring resonator (SPDC) [1]
AlN ring resonator (OPO) [2]
AlN ring resonator (QFC, quantum transduction) [3]
GaAs waveguide (SHG) [4]
LN ring resonator (SHG, SPDC) [5]
LN ring resonator (SRS, SHG, SFG) [6]
LN racetrack resonator (EO conversion) [7]
PPLN waveguide (cascaded SFG/DFG, QFC) [8]
SiN ring resonator (QFC) [9]

Multiple wavelength sources are similar to frequency converters but use multiple processes at once to produce a wide range of wavelengths from a single input frequency. Sources include frequency combs and supercontinuum generators (SCG), which are often achieved by third-order processes or cascaded second-order processes. For examples of these sources, see:

AlN waveguides (SCG, frequency comb) [10]
SiN ring resonator (frequency comb) [11]
SiN waveguide (SCG) [12]
SiGe waveguides (SCG) [13]

Modulators include any on-chip element that performs electro-optic modulation using an interaction between electric and optical fields. Commonly used nonlinear structures include ring resonators and MZIs. Electrodes near nonlinear ring resonators provide electrical signals that slightly shift the optical resonance frequencies by the microwave frequency. For MZIs, electrodes induce optical phase shifts in different branches, which then interfere constructively or destructively depending on the difference in phase shifts, effectively modulating the amplitude of optical signals using electrical controls. When tuned correctly, these devices convert the digital information between electrical signals and optical frequencies. For example devices, see:

AlN ring resonator (EO modulation) [14]

LN MZI (EO modulation) [15]

AlScN is rare in that it exhibits a strong optical nonlinearity while maintaining CMOS-compatibility. Its band gap is reasonable for waveguide propagation. Its refractive index is above 2, allowing it to guide optical modes in photonic circuits. It also exhibits ferroelectricity in samples with Sc concentrations above at least 10%, which would allow it to be periodically poled (also known as domain inversion) for quasi-phase matching in nonlinear optical applications. Combining these properties with our measurements of strong nonlinearity, AlScN is useful in nonlinear optical on-chip devices.

Previous research on AlScN includes measurements of its linear optical properties (refractive index, band gap, propagation loss in waveguide), piezoelectricity, and ferroelectricity. It has been used in electrical devices for its strong piezoelectric effect and in linear waveguides. However, there is no measurement of AlScN's nonlinear optical properties, whether $\chi^{(2)}$ or $\chi^{(3)}$ processes; the Pockels electro-optic effect is related to $\chi^{(2)}$, and the Pockels coefficient has not been measured either. Thus, there have not yet been nonlinear AlScN on-chip devices in photonics.

In comparison, AlN has been well studied in nonlinear optics; devices that exhibit SHG, OPO, and EO modulation have all been demonstrated. While research in AlN is well documented, AlScN has not been used in nonlinear optical applications. Thus, we consider any AlScN device with Sc concentration over 1% a separate material; below this, the device could be considered AlN-based. Furthermore, device designs have been explored. Nonlinear devices have been implemented with a wide range of other materials, including LN, AlN, and even Si. Aspects of the present disclosure relate to the use of AlScN as the nonlinear element in these types of devices.

The growth process of AlScN is also well documented and outside the scope of this disclosure. We utilize a growth process that produces high-quality AlScN thin films, but only consider the nonlinear applications with the material. Regardless of the growth mechanism or fabrication method for the device (direct growth, wafer bonding, etching process, etc.), we expect AlScN alloy thin films to exhibit enhanced optical nonlinearity, and consider the use of the nonlinear optical properties as part of this invention. Similarly thickness or sample quality of AlScN films will not change its nonlinear properties, so we include any nonlinear optical on-chip devices that are based on AlScN.

AlScN can be grown directly on Si/CMOS devices due to its low sputtering temperature, and exhibits stronger nonlinearity than AlN. Though band gap decreases with Sc concentration, it has been measured to be 4.5 eV at high Sc concentration, which is still larger than that of LN, allowing optical control for a wider range of wavelengths. Furthermore, at Sc concentrations above 10%, AlScN exhibits ferroelectricity and can be periodically poled for quasi-phase matching to ensure efficient frequency conversion in longer structures. In comparison, materials that are not ferroelectric require adjusting waveguide dimensions to ensure modal phase matching, which limits design possibilities. AlScN allows for easier and cheaper fabrication of efficient nonlinear optical devices.

Commercially, we expect this material to be particularly useful in integrated electro-optics due to its CMOS compatibility. Integrated electro-optic modulators are particularly important in telecommunication systems as they convert electrical signals to light signals and vice versa using chip-scale technology, resulting in an on-chip optical transceiver. They can also be utilized in quantum systems to convert information between superconducting qubits and optical photons. Existing products, such as those provided by HyperLight, often rely on the more mature material platform LN. However, while devices can be produced on a small scale, large scale fabrication of many devices is both difficult and expensive since LN is not CMOS-compatible. Furthermore, with large interest in using III-nitride materials like AlN for on-chip laser sources, efficient frequency conversion using AlScN enables tunable on-chip light sources for a vast range of applications.

Overall, the CMOS-compatibility of AlScN makes it a viable candidate to interface with silicon photonic devices as a nonlinear material with a strong second-order susceptibility.

Additional Disclosure

Alloys provide a promising solution to tune and increase $\chi^{(2)}$ while maintaining CMOS-compatibility. In particular, substitutional scandium (Sc) in $Al_{1-x}Sc_xN$ alloy thin films adjusts crystal structure and properties, notably increasing its piezoelectric response [16]. $Al_{1-x}Sc_xN$'s development for electrical devices has resulted in a robust, low-temperature fabrication process that produces high-quality, wafer-scale samples. Unlike many other non-linear materials, $Al_{1-x}Sc_xN$ is grown at low enough temperatures to be CMOS-compatible and retains a relatively large band gap. However, its nonlinear optical properties in the visible and NIR region have remained largely unexplored. Here, we report enhanced optical $\chi^{(2)}$ of $Al_{1-x}Sc_xN$ thin films based on second harmonic generation (SHG) measurements.

The $Al_{1-x}Sc_xN$ films were deposited in a pulsed DC physical vapor deposition system (Evatec CLUSTERLINE® 200 II) via co-sputtering from separate 4-inch Al and Sc targets at 350° C. in a pure $N_2$ environment with a gas flow of 20 scan. The power on the Al target was held at 1000 W while the power on the Sc target was adjusted to reach the desired Sc concentration.

TABLE 2

Properties of $Al_{1-x}Sc_xN$ films studied in this work.

| Sc % | $R_q$ (nm) | $R_a$ (nm) | t (nm) | XRD FWHM (deg) | $n_\omega$ |
|---|---|---|---|---|---|
| 0% | 2.68 | 2.16 | 480 | 1.405 | 2.05 |
| 10% | 2.33 | 1.89 | 479 | 1.735 | 2.06 |
| 20% | 1.97 | 1.59 | 474 | 1.619 | 2.14 |
| 28% | 2.05 | 1.64 | 445 | 1.624 | 2.15 |
| 36% | 1.80 | 1.44 | 486 | 1.695 | 2.21 |

Both RMS roughness ($R_q$) and average roughness ($R_a$) were measured over a 5 × 5 μm² area and are low for all samples, indicating smooth films for optical measurements.
Films are relatively thin, ranging around 440-490 nm.
The low full-width-half-max (FWHM) of X-ray diffraction (XRD) curves indicates highly oriented films.
Refractive index at 1550 nm $n_\omega$, measured by ellipsometry, slightly increases with Sc concentration.

The samples were grown on 100 mm diameter (100) Si wafers coated with 20 nm of (0001) Ti and 100 nm of (111) Pt. The bulk $Al_{1-x}Sc_xN$ was deposited with c-axis orientation perpendicular to the substrate, targeting a total thickness of 500 nm; the thickness of each sample was confirmed by cross-sectional SEM [FIG. 2a].

Figure 2B:
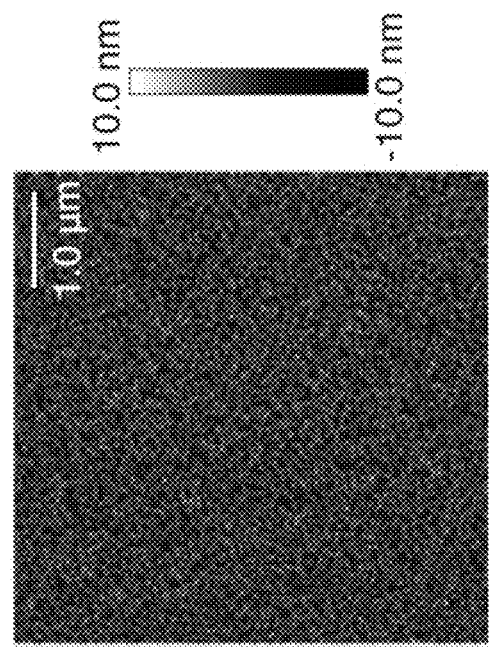
FIGS. 2A and 2B provide thin film characterization.
Figure 2A:
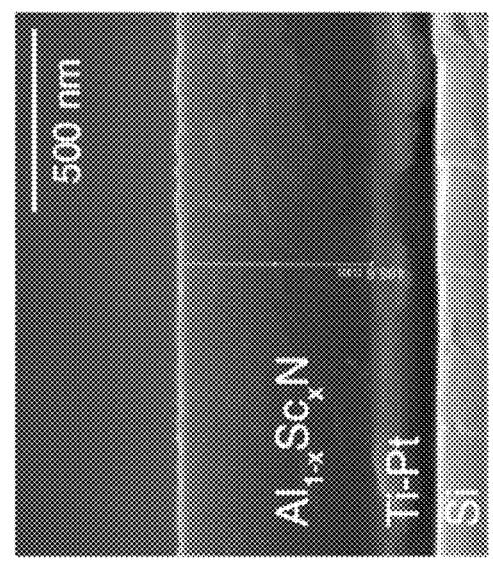

We confirmed the quality of our samples, even at high Sc concentration, by AFM imaging [FIG. 2B] and measuring surface roughness and full-width-half-maximum (FWHM) from X-ray diffraction (XRD) rocking curves [Table 2]. The AFM images confirm the lack of anomalously oriented grains [17], while low roughness over a large, 5×5 μm area and consistently sharp XRD curves indicate smooth, highly oriented films [16]. These films are still polycrystalline since in-plane orientation of crystal domains is random despite strong orientation along the direction perpendicular to the substrate. While our samples were grown directly on Pt to enable low-loss reflection SHG, the fabrication process can also be adapted for dielectric substrates, including silicon and sapphire, for low-loss optical and optoelectronic applications.

To determine absolute $\chi^{(2)}$ components, we utilize the relationship between the peak intensity of the fundamental light ($I_\omega$) and SHG ($I_{2\omega}$) [18]:

$$I_{2\omega} = \left[\frac{2\omega^2}{\epsilon_0 c^3 n_\omega^2 n_{2\omega}}\right][T_\omega^2 T_{2\omega} T_{2\omega}^{opt}]d_{eff}^2 I_\omega^2 L^2, \quad (1)$$

where L is the total path length travelled in the sample, $T_\omega$ ($T_{2\omega}$) is the polarization-dependent power transmission coefficient of fundamental (SH) light through the air-sample interface, $T_2^\omega$ opt is the effective power transmission coefficient of SH light through guiding optics after the sample, and $d_{eff}$ is the effective nonlinear coefficient. Power transmission coefficients were calculated using Fresnel equations complete reflection from the Pt substrate for both wavelengths was assumed.

The effective nonlinear coefficient $d_{eff}$ is determined by crystal symmetry. $Al_{1-x}Sc_xN$ exhibits wurtzite structure (6 mm) [16], so its nonzero $\chi^{(2)}$ components are $d_{33}$, $d_{31}=d_{32}=d_{15}=d_{24}$ using condensed notation and Kleinman symmetry [19]. In reflection geometry, shown in FIG. 3A, input polarization (p or s) determines how each component contributes to $d_{eff}$:

$$d_{eff,p}=d_{33}\times\sin^2\theta_\omega \sin\theta_{2\omega}+d_{31}\times 3\cos^2\theta_\omega \sin\theta_{2\omega} \quad (2)$$

$$d_{eff,s}=d_{31}\times\sin\theta_{2\omega} \quad (3)$$

where $\theta_\omega$ ($\theta_{2\omega}$) is the angle of refraction for fundamental (SH) light. Though the samples are polycrystalline in the crystal plane, the in-plane polarization components of p- and s-polarized fundamental light contribute to the SH signal, which is p-polarized in both cases.

L is calculated using cross-sectional SEM thickness measurements in Table 2 and angle of refraction. Effective refractive index was determined via ellipsometry and prism coupling [Table 2].

Samples with higher Sc concentration have a slightly higher refractive index, which is consistent with other measurements of refractive index [20]. Dispersion is negligible as the difference in refractive index at the fundamental and SH wavelengths is approximately 0.02-0.03. Coherence length $L_{coh}=2/\Delta k$ ranges from 8-12 μm, which is much larger than the studied films' thicknesses; as such, perfect phase matching can be assumed for our samples. By comparing the relative strength of the SH signals induced by p- and s-polarized fundamental light, we extract $d_{33}$ and $d_{31}$ using Eqn. 1-3.

Figure 3B:
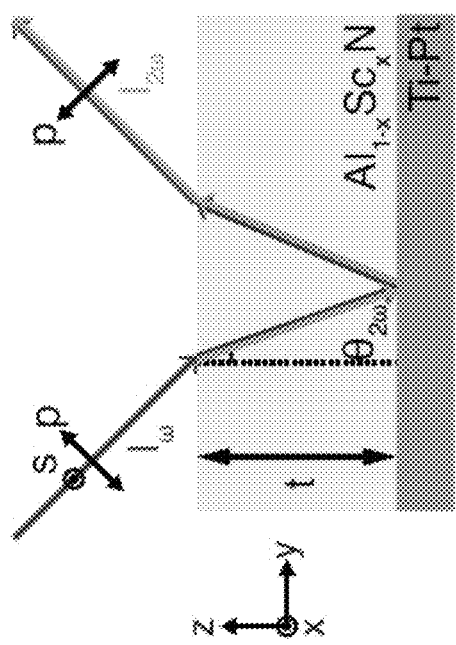
FIGS. 3A and 3B provide a schematic of second-harmonic generation (SHG) measurement technique.
Figure 3A:
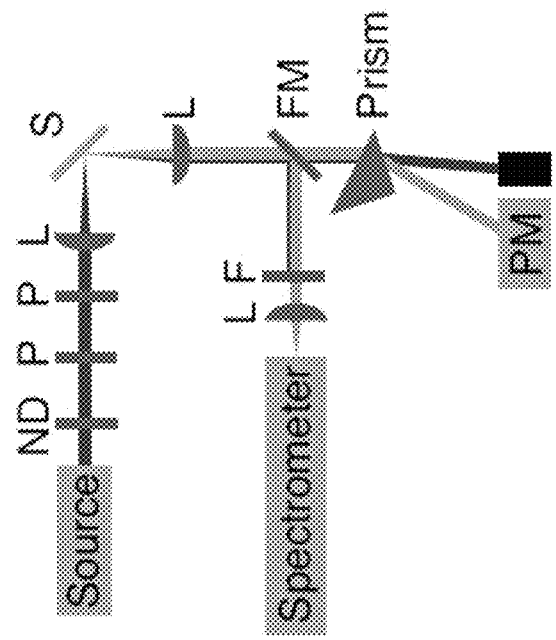
Figures 7A, 7B, 7C, 7D, 7E, 7F, 7G:
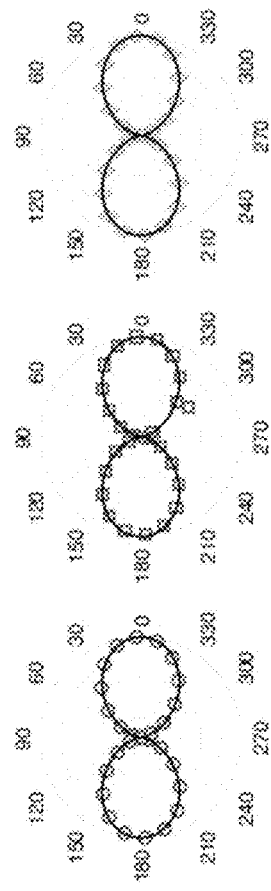
FIGS. 7A-7G provide SHG polarization of (FIG. 7A) AlN with p-polarized input, (FIG. 7B) $Al_{0.90}Sc_{0.10}N$ with p-polarized input, (FIG. 7C) $Al_{0.80}Sc_{0.20}N$ with p-polarized input, (FIG. 7D) $Al_{0.72}Sc_{0.28}N$ with p-polarized input, (FIG. 7E) $Al_{0.72}Sc_{0.28}N$ with s-polarized input, (FIG. 7F) $Al_{0.64}Sc_{0.36}N$ with p-polarized input, and (FIG. 7G) $Al_{0.64}Sc_{0.36}N$ with s-polarized input. Black lines indicate normalized fits for a p-polarized signal; data from each sample has been normalized by its maximum signal. Only $Al_{0.72}Sc_{0.28}N$ and $Al_{0.64}Sc_{0.36}N$ exhibited strong enough SH signals from s-polarized input to measure polarization. The outlier for the sample with 10% Se is attributed to a brief increase in background light. SH signal is p-polarized regardless of sample or input polarization, confirming our use of wurtzite symmetry.
Figures 10A, 10B, 10C, 10D:
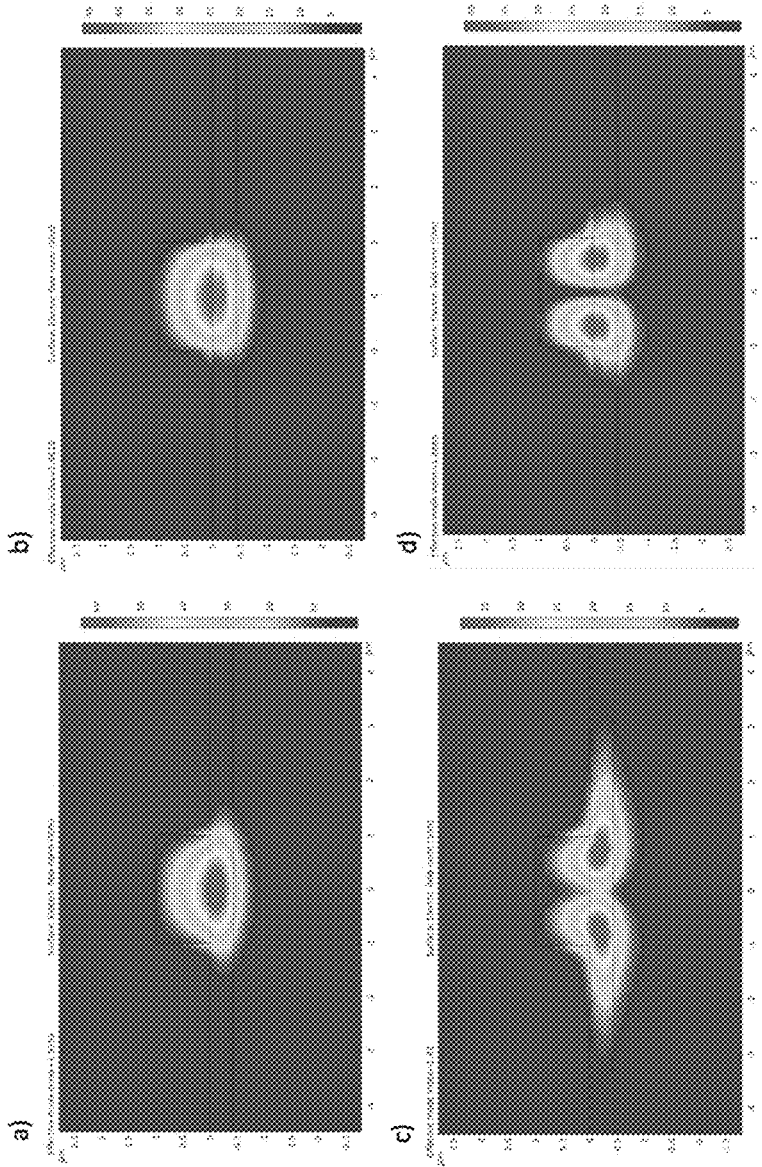
FIGS. 10A-10D provide COMSOL simulations for exemplary electric field magnitude of guided modes, characterized by spatial localization.
Figure 11B:
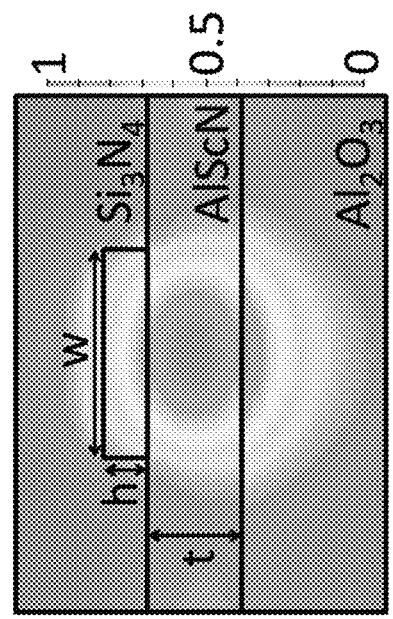
FIGS. 11A and 11B provide normalized electric fields for transverse magnetic (TM) modes of two waveguides.
Figure 11A:
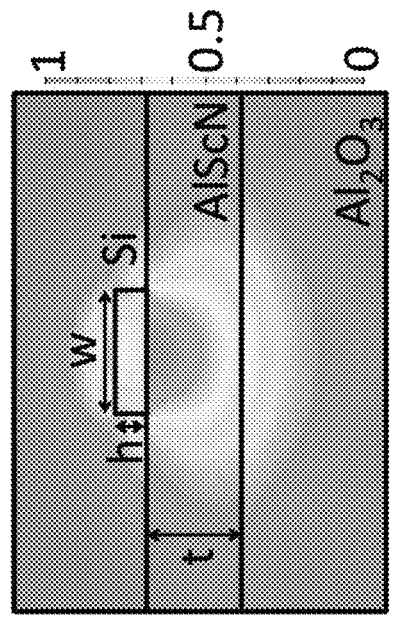
Figure 12B:
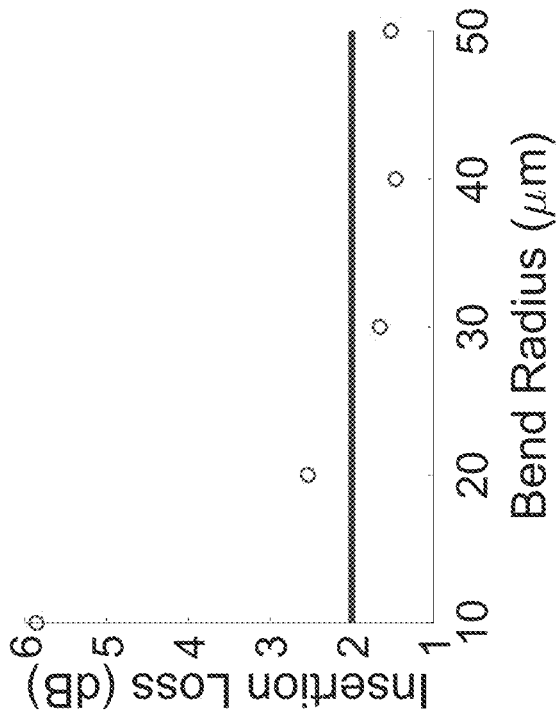
FIGS. 12A and 12B provide simulated bending loss for TM modes of two waveguides.
Figure 12A:
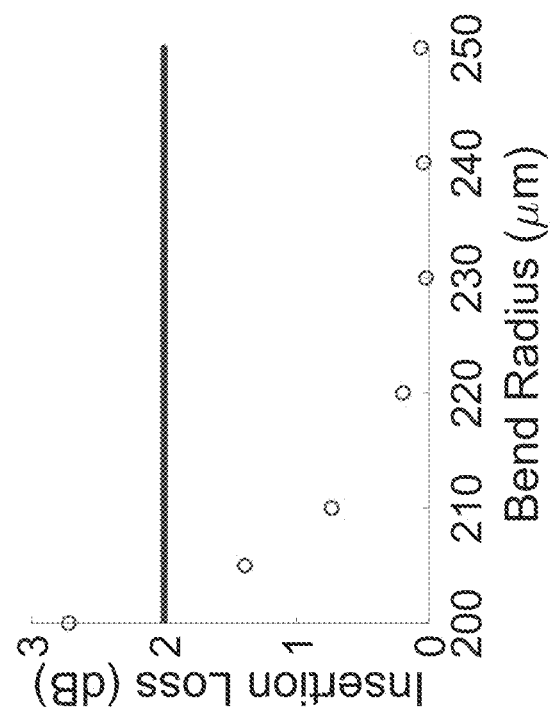
Figure 13:
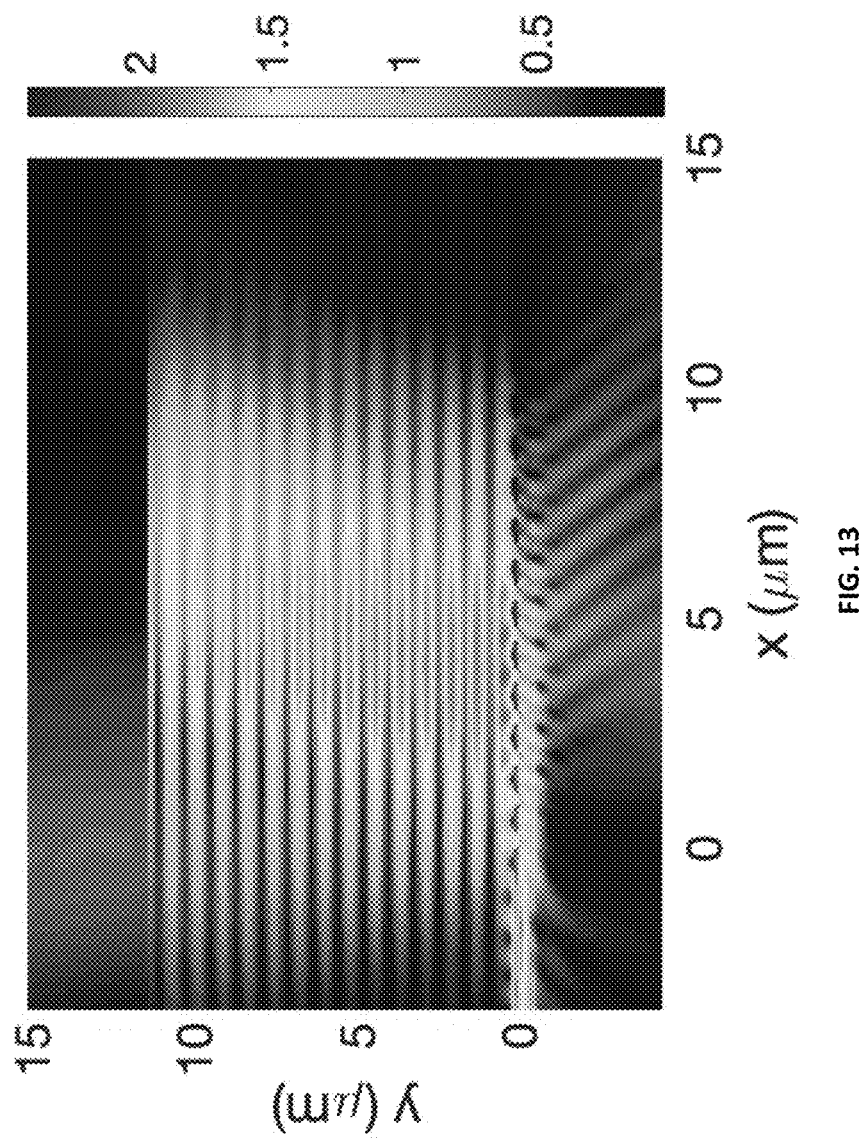
FIG. 13 provides an electric field heat map for grating coupler comprised of etched α-Si on $Al_{0.80}Sc_{0.20}N$ on sapphire. Light from a fiber is coupled from the top right into a waveguide that travels to the left. Leakage to the substrate is present but relatively small compared to the field that is coupled into the waveguide.
Figure 14:
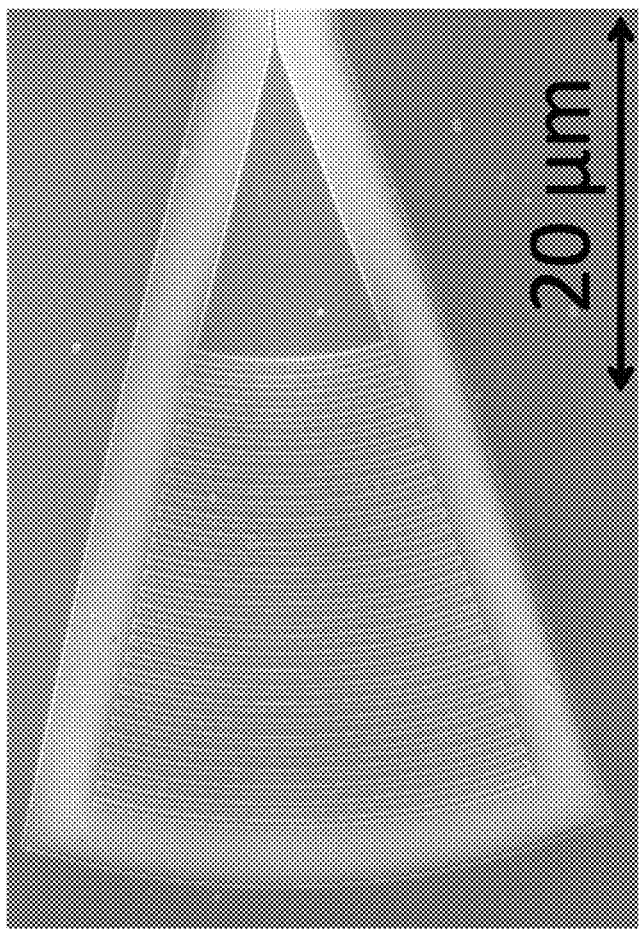
FIG. 14 provides a fabricated grating coupler of α-Si on $Al_{0.80}Sc_{0.20}N$ sapphire. The grating lines have a periodicity of 0.90 μm and filling factor around 0.65.
Figures 15A, 15B:
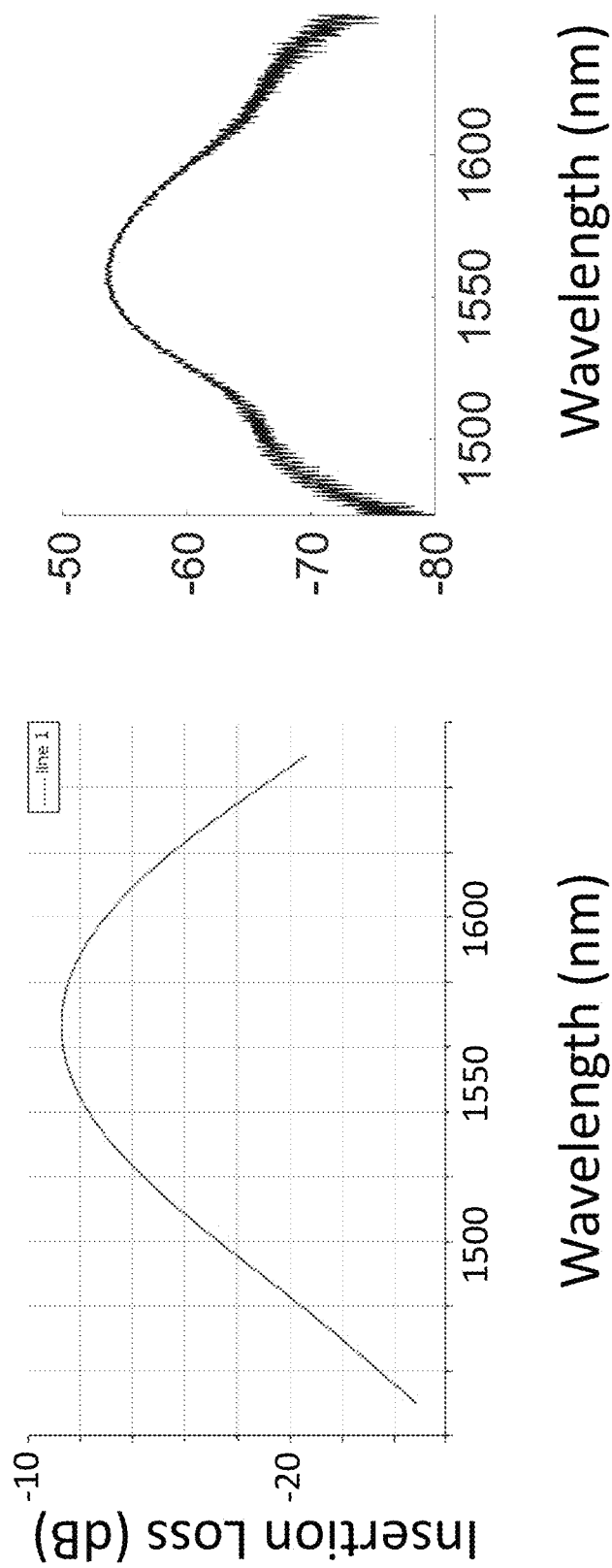
FIGS. 15A and 15B provide a comparison of (FIG. 15A) simulated insertion loss of one grating coupler comprised of SiN on $Al_{0.80}Sc_{0.20}N$ on sapphire and (FIG. 15B) experimental loss for two grating couplers of SiN on $Al_{0.80}Sc_{0.20}N$ on sapphire connected by a waveguide. Though experimental loss is higher than expected, it indicates viability of this coupling method.
Figure 16B:
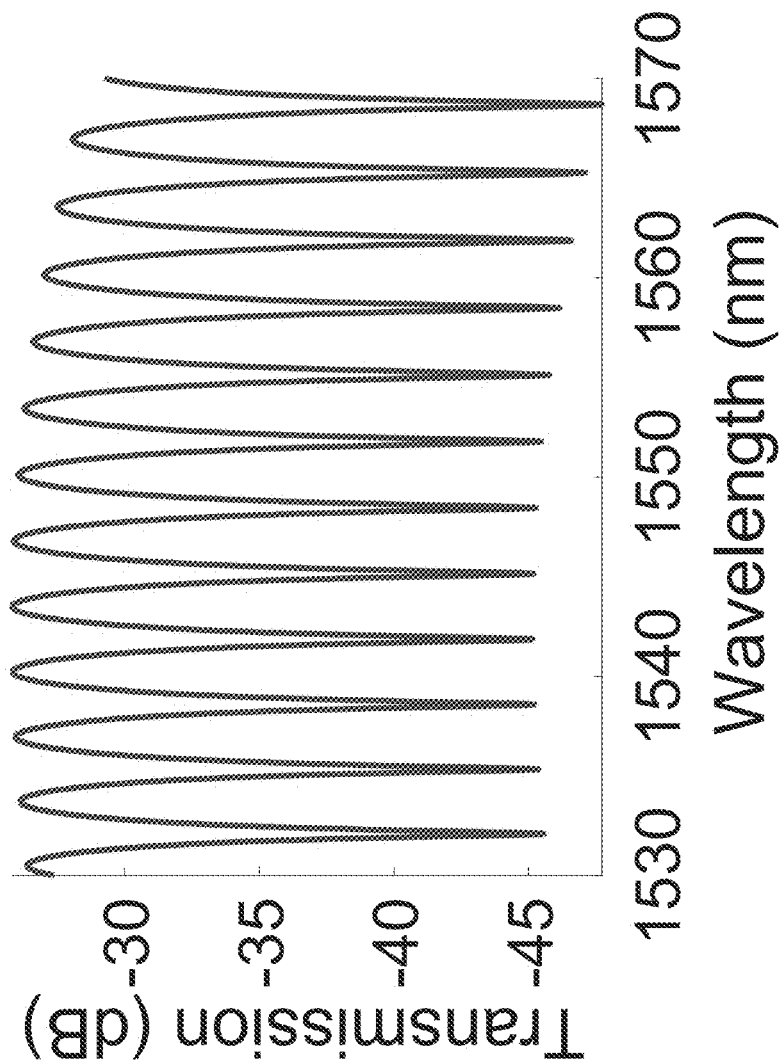
FIGS. 16A and 16B provide (FIG. 16A) a layout of a Mach-Zehnder Interferometer (MZI).
Figure 16A:
Figure 17A:
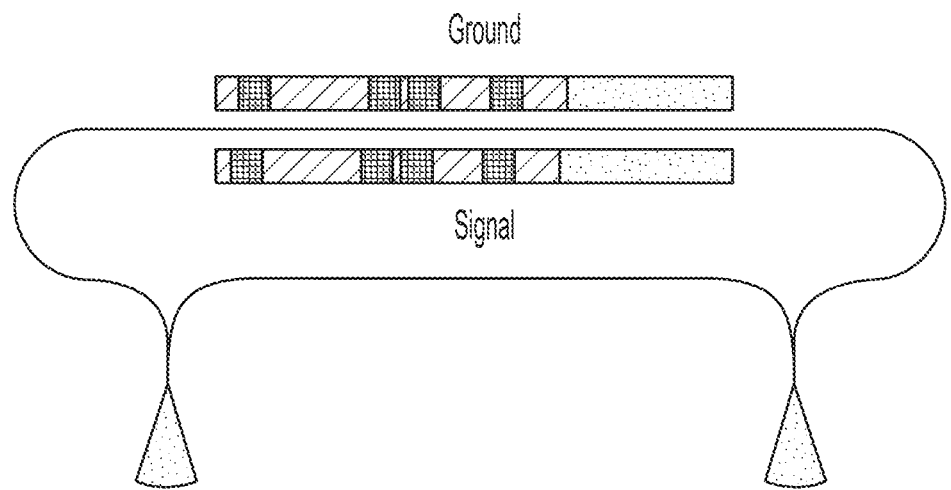
FIGS. 17A and 17B provide two electrode configurations for electro-optic (EO) modulators based on MZIs.
Figure 17B:
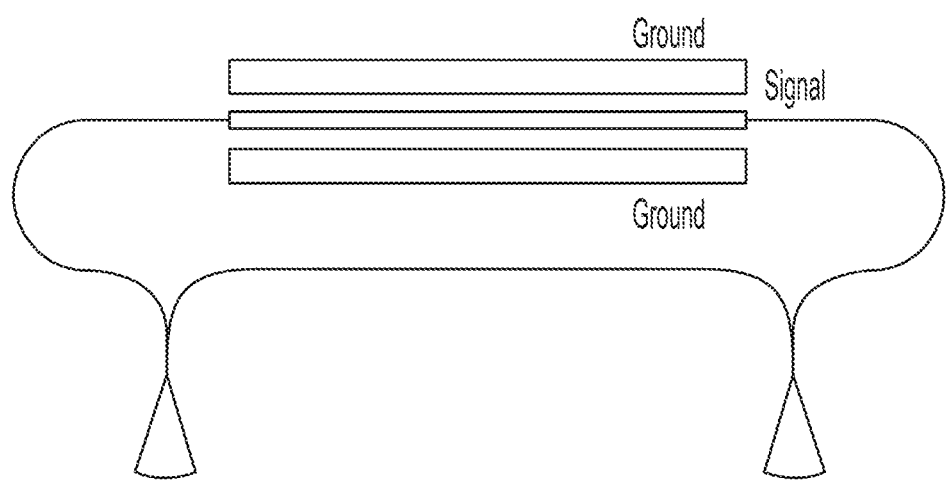

We measured the polarization-dependent reflected SI-IG from each sample using the setup shown in FIG. 3B. Source light from an optical parametric amplifier pumped by a Yb:KGW laser amplifier (PHAROS, Light Conversion) at 1550 nm with 159 fs pulse duration and 3 kHz repetition rate was incident upon our samples at an angle of 45°. Focused beam size at the sample surface was 0.01 mm² based on knife edge measurements. The polarization was controlled to be either p- or s-polarized using two crossed polarizers. The reflected light signal at 775 nm was directed to a calibrated power sensor for absolute power characterization or a spectrometer for spectral measurements. All measurements were taken under the same conditions, accounting for sample differences like film thickness and refractive index. We confirmed the quadratic power dependence of the signal for each sample to ensure that the signal was due to perturbative SHG, as shown in FIG. 4A. The SHG in each sample exhibits p-polarization for both s- and p-polarized fundamental light, as shown in FIG. 7, corroborating the above SHG analysis. SH spectra in FIG. 4B indicate significant dependence on Sc concentration.

Figure 5:
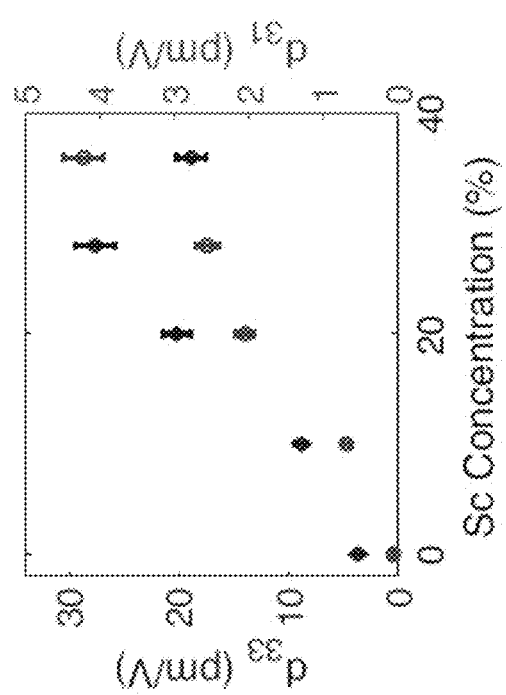
FIG. 5 provides experimentally measured $d_{33}$ (blue diamonds) and $d_{31}$ (red circles) as functions of Sc concentration.

The measured $d_{33}$ and $d_{31}$ values for all samples are shown in FIG. 5 and Table 1. For intrinsic AlN, we calculate $d_{33}$=3.6±0.4 pm/V and $d_{31}$=0.06±0.005 pm/V. Other experimental $\chi^{(2)}$ measurements for AlN range from 4 pm/V [21] to 11 pm/V [22] for $d_{33}$ and smaller values ranging from 0.04 pm/V [21] to 0.31 pm/V for $d_{31}$ [23]. Thus, our calculations provide reasonable values for $d_{33}$ and $d_{31}$ of AlN. For $Al_{0.72}Sc_{0.28}N$, we observe the largest $d_{33}$ at 27.7±1.8 pm/V, similar to LN; its $d_{31}$=2.6±0.1 pm/V is also strongly enhanced compared to that of intrinsic AlN. For $Al_{0.64}Sc_{0.36}N$, the $d_{33}$ is slightly lower at 18.9±1.3 pm/V, but its $d_{31}$ is enhanced even further to 4.2±0.3 pm/V.

Figure 4B:
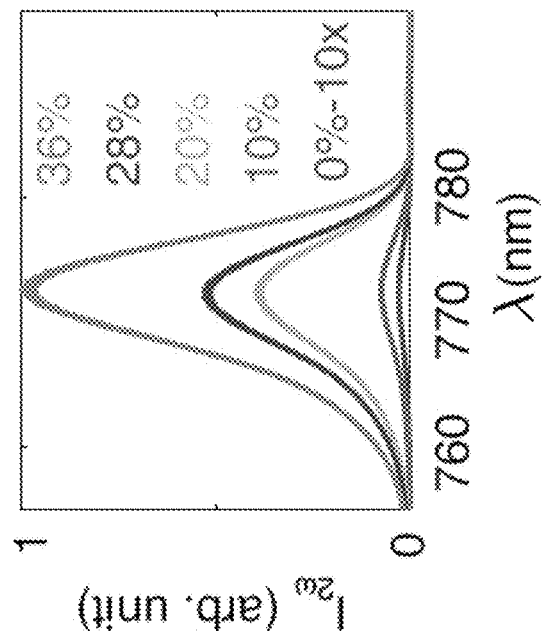
FIGS. 4A and 4B provide SHG measurement.
Figure 4A:
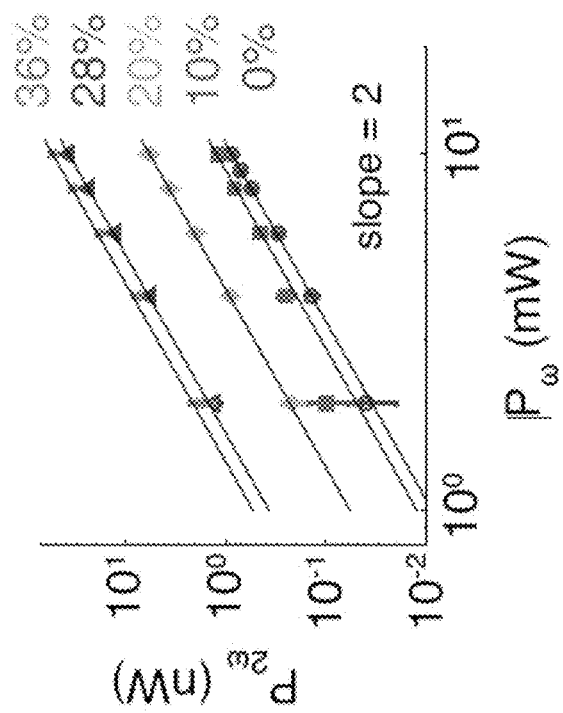
Figures 6A, 6B:
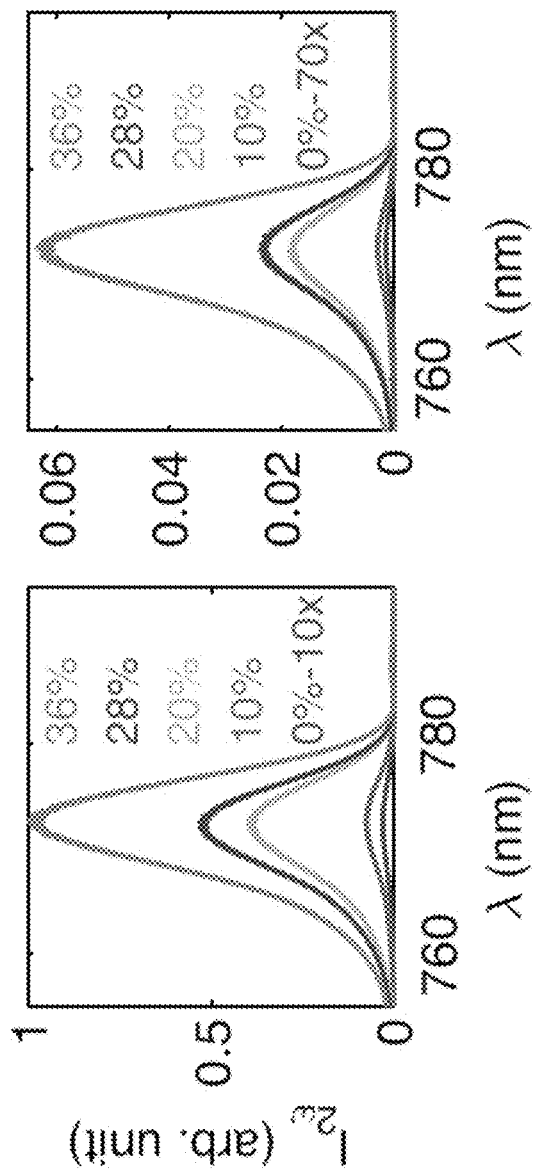
FIGS. 6A and 6B provides SH spectra for (FIG. 6A) p-polarized input and (FIG. 6B) s-polarized input, labelled by percentage of Sc. The signal from the 0% Sc sample has been scaled for better visibility in both FIGS. 6A-6B by factors of 10 and 70 respectively. Samples with higher Sc concentration exhibit stronger SHG. SH spectra confirm the wavelength of SH signals is around 775 nm, as expected for 1550 nm input. The asymmetric spectrum shape is due to the spectral signature from the OPA source and is consistent regardless of the input polarization. Note that the scale for SH signals from p-polarized input is roughly 20 times larger than that for s-polarized input.

Both $d_{33}$ and $d_{31}$ contribute to the SHG signal generated by p-polarized light, as shown in FIG. 4B, while SHG signal generated by s-polarized fundamental light, as shown in FIG. 6B, emerges solely from $d_{31}$. By measuring the ratios of the SHG signal induced by s- and p-polarized fundamental light for each sample, it is found that $d_{33}$ and $d_{31}$ show different trends. For AlN, its $d_{33}$ value is larger than $d_{31}$ by over an order of magnitude. In comparison, samples with higher Sc concentration exhibit a less dramatic difference between $d_{33}$ and $d_{31}$. As a result, the large SH signal of $Al_{0.64}Sc_{0.36}N$ generated by p-polarized light is due primarily to the significant increase in $d_{31}$, rather than larger $d_{33}$.

Discussion

The $\chi^{(2)}$ enhancement can be attributed to changes in crystal structure. $Al_{1-x}Sc_xN$'s enhanced piezoelectricity is attributed to Sc destabilizing AlN's wurtzite structure [16]. In SHG and piezoelectricity, a material polarization is induced by an optical or a mechanical perturbation, respectively. As such, the softened wurtzite structure due to substitutional Se is expected to cause a large $\chi^2$) response as well. We expect $\chi^{(2)}$ enhancement to continue until centrosymmetric cubic ScN grains begin to form at Sc concentrations around 43% [16]. It also is possible that this softening in crystal structure affects the relative strength of $\chi^{(2)}$ components, with higher Sc concentration inducing a lower ratio of $d_{33}$ compared to $d_{31}$. Without being bound to any particular theory or embodiment, depending on the application, if $d_{31}$ is the only component in use, a stronger Sc percentage can be employed. If $d_{33}$ or both components are utilized, a slightly lower concentration may be more useful.

While we directly measured the second-order nonlinear optical susceptibility at optical frequencies, the enhancement from strained wurtzite structure (without being bound to any particular theory) may persist at lower frequencies in the microwave regime. Since the Pockets coefficient can be expressed in terms of $\chi^{(2)}$ at different frequencies [24], $Al_{1-x}Sc_xN$ (without being bound to any particular theory) may exhibit a stronger Pockets effect than intrinsic AlN, with potential applications in efficient FO modulators or integrated quantum transducers.

It has also been found that Sc concentration affects absorption properties in the visible to ultraviolet wavelength range. While AlN exhibits a large 6 eV band gap, $Al_{1-x}Sc_xN$ has a smaller band gap, with high quality $Al_{0.59}Sc_{0.41}N$ displaying a 4.5 eV band gap and higher absorption at sub-band gap energies [20]. Sample quality also has a significant effect, since $Al_{0.66}Sc_{0.34}N$ was reported to have a band gap of 2.94 eV [25]. This was attributed to cubic ScN grain formation at Sc concentrations as low as 20%, which (without being bound to any particular theory) may be due to the differences in the fabrication methods [20, 25]. Furthermore, AlN has a direct band gap, while $Al_{1-x}Sc_xN$'s band gap may (without being bound to any particular theory) become indirect past concentrations of 23% Sc based on a larger measured optical band gap compared to theoretical predictions [20].

Applications that utilize longer wavelengths would be minimally affected by the change in band gap. Measurements of $Al_{0.85}Sc_{0.15}N$ photonic waveguides indicate losses of 9±2 dB/cm at 1550 nm; however, optimizing the etching process is expected to significantly reduce side-wall roughness and loss [26]. We performed prism coupling measurements of propagation loss for a wafer of $Al_{0.64}Sc_{0.36}N$ on sapphire, which indicate losses around 17.2 dB/cm at 1550 nm, and higher loss above 30 dB/cm at 633 nm. For an $Al_{0.80}Sc_{0.20}N$ sample, the loss at 1550 nm is much lower, around 8.2 dB/cm, with loss above 30 dB/cm at 633 nm as well. Though relatively high, these propagation loss measurements provide an estimate of loss from absorption and, without being bound to any particular theory or embodiment, may be improved by optimizing grain structure. Thus, $Al_{1-x}Sc_xN$ can be used in waveguides and other on-chip optical elements. For applications at shorter wavelengths, lower Sc concentrations can enhance $\chi^{(2)}$ with less effect on absorption.

Another consideration is quasi-phase matching. While modal phase matching can enable high performance devices, it requires precise waveguide design and adds further constraints. Thus, many devices opt instead to use ferroelectric nonlinear materials, such as LN, which can be periodically poled to achieve quasi-phase matching. While periodic poling of non-ferroelectric materials is possible through doping and other fabrication techniques [27], it requires additional complicated techniques. Devices with AlN have used modal phase matching, but $Al_{1-x}Sc_xN$ is ferroelectric for Sc concentrations above 10%, which (without being bound to any particular theory) allows periodic poling in thin films [28]. The films studied in this work were grown using identical processes to films exhibiting ferroelectric switching with poling parameters given in [29] and [30], indicating periodic poling for quasi-phase matching in these films.

In conclusion, we measured SHG from $Al_{1-x}Sc_xN$ alloy thin films and report significant enhancement of $\chi^{(2)}$ values with increasing Sc concentration, up to a factor nearing 8 for $Al_{0.72}Sc_{0.28}N$. Films were fabricated using a low temperature, CMOS-compatible procedure; characterization with AFM and XRD confirms high-quality, well-oriented polycrystalline films. Despite the decrease in band gap with the addition of Sc, we expect this material to still be applicable for devices operating at NIR wavelengths. Furthermore, controlling Sc concentration tunes material properties such as $\chi^{(2)}$ and loss to suit individual applications. As a CMOS-compatible material, $Al_{1-x}Sc_xN$ could more easily combine cutting-edge nonlinear technology with mature silicon photonics and enable large-scale production of integrated nonlinear devices, ranging from on-chip frequency converters to single-photon sources.

ASPECTS

The follow Aspects are illustrative only and do not limit the scope of the present disclosure or the appended claims.

Aspect 1. An optical component having nonlinear characteristics, the optical component comprising: a first substrate defining a refractive index; and a nonlinear layer, the nonlinear layer disposed on the first substrate, the nonlinear layer comprising an amount of scandium (Sc), and the nonlinear layer defining a refractive index that is higher than the refractive index of the first substrate.

Aspect 2. The optical component of Aspect 1, wherein the nonlinear layer comprises AlScN.

Aspect 3. The optical component of any one of Aspects 1 to 2, wherein the nonlinear layer comprises up to about 40 mol % Sc.

Aspect 4. The optical component of Aspect 3, wherein the nonlinear layer comprises up to about 35 mol % Sc.

Aspect 5. The optical component of Aspect 4, wherein the nonlinear layer comprises up to about 30 mol % Sc.

Aspect 6. The optical component of Aspect 5, wherein the nonlinear layer comprises up to about 20 mol % Sc. The nonlinear layer can comprise about, e.g., 1, 2, 3, 4, 5, 6, 7, 8, 9, 10, 11, 12, 13, 14, 15, 16, 17, 18, 19, or about 20 mol % Sc.

Aspect 7. The optical component of any one of Aspects 1 to 6, wherein the nonlinear layer defines a $d_{33}$ value in the range of from about 1 to about 100 pm/V, e.g., from about 1 to about 90 pm/V, from about 3 to about 80 pm/V, from about 4 to about 30 pm/V, and all intermediate values and ranges.

Aspect 8. The optical component of any one of Aspects 1 to 7, wherein the nonlinear layer defines a $d_{31}$ value in the range of from about 1 to about 100 pm/V, e.g., from about 1 to about 90 pm/V, from about 3 to about 80 pm/V, from about 4 to about 30 pm/V, and all intermediate values and ranges.

Aspect 9. The optical component of any one of Aspects 1 to 8, wherein the nonlinear layer defines an RMS roughness ($R_q$) of less than about 3 nm. As some examples, the $R_q$ can be from about 1.5 to about 2.9 nm, from about 1.6 to about 2.8 nm, or even from about 1.8 to about 2.7 nm.

Aspect 10. The optical component of any one of Aspects 1 to 9, wherein the nonlinear layer defines an average roughness ($R_q$) of less than about 3 nm. As some examples, the $R_a$ can be from about 1.3 to about 2.9 nm, from about 1.4 to about 2.8 nm, or even from about 1.5 to about 2.7 nm.

Aspect 11. The optical component of any one of Aspects 1 to 10, wherein the nonlinear layer defines an x-ray diffraction full width at half maximum (XRD FWHM) of up to about 2.5 deg, e.g., from about 1.40 to about 1.75 deg.

Aspect 12. The optical component of any one of Aspects 1 to 11, wherein the nonlinear layer defines a refractive index at 0.1550 nm of from about 2 to about 2.4, e.g., about 2, about 2.1, about 2.2, about 2.3 or about 2.4.

Aspect 13. The optical component of any one of Aspects 1 to 12, wherein the nonlinear layer defines a thickness in the range of from about 10 to about 3000 nm, e.g. from about 200 to about 500 nm.

Aspect 14. The optical component of any one of Aspects 1 to 13, wherein the first substrate comprises any one or more of Si, SiC, SiN, or $Al_2O_3$.

Aspect 15. The optical component of any one of Aspects 1 to 14, further comprising a second layer, the second layer being defined atop the nonlinear layer.

Aspect 16. The optical component of Aspect 15, wherein the second layer defines a refractive index, the refractive index of the second layer being lower than the refractive index of the nonlinear layer.

Aspect 17. The optical component of any one of Aspects 15 to 16, wherein the second layer defines (a) a thickness of up to about 200 nm, (b) a width of up to about 2 micrometers, or both (a) and (b).

Aspect 18. The optical component of any one of Aspects 15 to 17, wherein the second layer defines a guided mode of any polarization (whether horizontal or vertical) and order (whether first order or higher) within the nonlinear layer, such that light is primarily localized to the vicinity of the second layer laterally and to the vicinity of the second layer and nonlinear material vertically. Exemplary modes are provided in FIGS. 10A-10D.

Aspect 19. The optical component of any one of Aspects 15 to 18, further comprising a buffer surmounting the second layer and optionally surmounting the nonlinear layer.

Aspect 20. The optical component of any one of Aspects 1 to 19, further comprising a signal electrode in electrical communication with the nonlinear layer.

Aspect 21. The optical component of any one of Aspects 1 to 20, further comprising a ground electrode in electrical communication with the nonlinear layer.

Aspect 22. The optical component of any one of Aspects 1 to 21, wherein the nonlinear layer defines a closed curve. The second layer (e.g., Aspect 15) can also define a closed curve (though this is not a requirement); a second layer can be etched to define device geometry. The nonlinear layer can be deposited so as to firm a closed curve; a nonlinear layer can also be etched to provide the desired geometry.

Aspect 23. The optical component of any one of Aspects 1 to 22, wherein the nonlinear layer or second layer defines a linear segment. A nonlinear layer or second layer can also define a Y-branch (e.g., via splitting a linear segment into two separate linear segments or combining two linear segments into a single linear segment), a grating coupler (e.g., a periodic series of linear or curved segments used to couple light from an optical fiber into or out of the on-chip linear segments), or an edge coupler (e.g., a linear segment that is tapered near the chip edge to couple light from an optical fiber into or out of the on-chip linear segments).

Aspect 24. The optical component of any one of Aspects 1 to 23, wherein the component is configured as a frequency converter, a multiple wavelength source, or a modulator.

Aspect 25. The optical component of any one of Aspects 1 to 24, wherein the optical component is defined on a single chip.

Aspect 26. A method, comprising operating an optical component according to any one of Aspects 1 to 25 so as to effect a signal from the optical component.

Aspect 27. A method, comprising fabricating an optical component according to any one of Aspects 1 to 25, wherein the nonlinear layer is placed on the first substrate via vapor deposition.

REFERENCES

[1] X. Guo, C.-L. Zou, C. Schuck, H, Jung. R. Cheng, and H. X. Tang, "Parametric down-conversion photon-pair source on a nanophotonic chip," Light: Science & Applications 6, e16249-e16249 (2017).

[2] A. W. Bruch, X. Liu, J. B. Surya, C.-L. Zou, and H. X. Tang, "On-chip $\chi(2)$ microring optical parametric oscillator," Optica 6, 1361-1366 (2019).

[3] L. Fan, C.-L. Zou, R. Cheng, X. Guo, X. Han. Z. Gong, S. Wang, and H. X. Tang. "Super-conducting cavity electro-optics: A platform for coherent photon conversion between superconducting and photonic circuits," Science Advances 4 (2018).

[4] L. Chang, A. Boes, X. Guo. D. T, Spencer, M. J. Kennedy, J. D. Peters, N. Volet, J. Chiles, A. Kowligy, N. Nader, D. D. Hickstein, E. J. Stanton, S. A. Diddams, S. B. Papp, and J. E. Bowers, "Heterogeneously Integrated GaAs Waveguides on Insulator for Efficient Frequency Conversion," Laser & Photonics Reviews 12, 1800149 (2018).

[5] R. Luo, H. Jiang, S. Rogers, H. Liang, Y. He, and Q. Lin, "On-chip second-harmonic generation and broadband parametric down-conversion in a lithium niobate microresonator." Opt. Express 25, 24531-24539 (2017).

[6] R. Wolf, I. Breunig, H. Zappe, and K. Buse, "Cascaded second-order optical nonlinearities in on-chip micro rings," Opt. Express 25, 29927-29933 (2017).

[7] T. P. McKenna, J. D. Witmer, R. N. Patel, W. Jiang, R. V. Laer, P. Arrangoiz-Arriola, E. A. Wollack, J. F. Herrmann, and A. H. Safavi-Naeini, "Cryogenic microwave-to-optical conversion using a triply resonant lithium-niobate-on-sapphire transducer," Optica 7, 1737-1745 (2020).

[8] T. Xiang, Q.-C. Sun, Y. Li, Y. Zheng, and X. Chen, "Single-photon frequency conversion via cascaded quadratic nonlinear processes," Phys. Rev. A 97, 063810 (2018).

[9] A. Singh, Q. Li, S. Liu, Y. Yu, X. Lu. C. Schneider, S. Höfting, J. Lawall, V. Verma, R. Mirin, and et al., "Quantum frequency conversion of a quantum dot single-photon source on a nanophotonic chip," Optica 6, 563 (2019).

[10] D. D. Hickstein, H. Jung, D. R. Carlson, A. Lind, I. Coddington, K. Srinivasan, G. G. Ycas, D. C. Cole, A. Kowligy, C. Fredrick, S. Droste, E. S. Lamb, N. R. Newbury, H. X. Tang, S. A. Diddams, and S. B. Papp, "Ultrabroadband supercontinuum generation and frequency-comb stabilization using on-chip waveguides with both cubic and quadratic nonlinearities," Phys. Rev. Applied 8, 014025 (2017).

[11] S. Miller, K. Luke, Y. Okawachi, J. Cardenas, A. L. Gaeta, and M. Lipson, "On-chip frequency comb generation at visible wavelengths via simultaneous second- and third-order optical nonlinearities," Opt. Express 22, 26517-26525 (2014).

[12] J. P. Epping, T. Hellwig, M. Hoekman, R. Mateman, A. Leinse, R. G. Heideman, A. van Rees, P. J. M. van der Slot, C. J. Lee, C. Fallnich, and K.-J. Boller, "On-chip visible-to-infrared super-continuum generation with more than 495 THz spectral bandwidth," Opt. Express 23, 19596-19604 (2015).

[13] M. Montesinos-Ballester, C. Lafforgue, J. Frigerio, A. Ballabio, V. Vakarin, Q. Liu, J. M. Ramirez, X. L. Roux, D. Bouville, A. Barzaghi, C. Alonso-Ramos, L. Vivien, G. Isella, and D. Marris-Morini, "On-Chip Mid-Infrared Supercontinuum Generation from 3 to 13 µm Wavelength," ACS Photonics 7, 3423-3429 (2020).

[14] C. Xiong, W. H. P. Pernice, and H. X. Tang, "Low-Loss, Silicon Integrated, Aluminum Nitride Photonic Circuits and Their Use for Electro-Optic Signal Processing," Nano Letters 12, 3562-3568 (2012).

[15] C. Wang, M. Zhang, X. Chen, M. Bertrand, A. Shams-Ansari, S. Chandrasekhar, P. Winzer, and M. Lončar, "Integrated lithium niobate electro-optic modulators operating at CMOS-compatible voltages," Nature 562, 101-104 (2018).

[16] M. Akiyama, T. Kamohara, K. Kano. A. Teshigahara, Y. Takeuchi, and N. Kawahara, "Enhancement of piezoelectric response in scandium aluminum nitride alloy thin films prepared by dual reactive cosputtering," Advanced Materials 21, 593-596 (2009).

[17] S. Fichtner, N. Wolff, G., Krishnatnurthy, A. Petraru, S. Bohse, F. Lofink, S. Chemnitz, H. Kohistedt, L. Kienle, and B. Wagner, "Identifying and overcoming the interface originating c-axis in-stability in highly Sc enhanced AlN for piezoelectric micro-electromechanical systems," Journal of Applied Physics 122, 35301 (2017).

[18] I. Shoji, I. Kondo, A. Kitatnoto, M. Shirane, and R. Ito, "Absolute scale of second-order nonlinear-optical coefficients," J. Opt. Soc. Am. B 14, 2268-2294 (1997).

[19] B. E. A. Saleh and M. C. Teich, *Fundamentals of Photonics,* 3rd ed. (John Wiley & Sons, 1991) Chap. 22.

[20] M. Baeumler, Y. Lu, N. Kurz, L. Kirste, M. Prescher, T. Christoph, J. Wagner, A. ukauskaitė, and O. Ambacher, "Optical constants and band gap of wurtzite $Al_{1-x}Sc_xN/Al_2O_3$ prepared by magnetron sputter epitaxy for scandium concentrations up to x=0.41," Journal of Applied Physics 126, 45715 (2019).

[21] G. T. Kiehne, G. K. L. Wong, and J. B. Ketterson, "Optical second-harmonic generation in sputter-deposited AlN films," Journal of Applied Physics 84, 5922-5927 (1998).

[22] M. C. Larciprete, A. Bosco, A. Belardini, R. Li Voti, G. Leahu, C. Sibilia, E. Fazio, R. Ostuni, M. Bertolotti, A. Passaseo, B. Pati, and Z. Del Prete, "Blue second harmonic generation from aluminum nitride films deposited onto silicon by sputtering technique," Journal of Applied Physics 100, 023507 (2006).

[23] Y. Fujii, S. Yoshida, S. Misawa, S. Maekawa, and T. Sakudo, "Nonlinear optical susceptibilities of AlN film," Applied Physics Letters 31, 815-816 (1977).

[24] R. W. Boyd, *Nonlinear Optics,* 3rd ed. (Academic Press, 1992).

[25] R. Deng, S. R. Evans, and D. Gall, "Bandgap in $Al_{1-x}Sc_xN$," Applied. Physics Letters 102, 112103 (2013).

[26] S. Zhu, Q. Zhong, N. Li, T. Hu, Y. Dong, Z. Xu, Y. Zhou, Y. H. Fu, and N. Singh, "Integrated ScAlN Photonic Circuits on Silicon Substrate," in 2020 *Conjerence on Lasers and Electro-Opties (CLEO)* (2020).

[27] J. Wright, C. Moe, A. V. Sampath, G. A. Garrett, and M. Wraback, "Fabrication of periodically poled AlN with sub-micron periods," physica status solidi c 8, 2331-2333 (2011).

[28] S. Ilasuoka, T. Shimizu, A. Tateyama, M. Uehara, H. Yamada, M. Akiyama, Y. Hiranaga, Y. Cho, and H. Funakubo, "Effects of deposition conditions on the ferroelectric properties of $(Al_{1-x}Sc_x)N$ thin films," Journal of Applied Physics 128, 114103 (2020).

[29] D. Wang, J. Zheng, P. Musavigharavi, W. Zhu, A. C. Toucher, S. E. Trolier-McKinstry, E. A. Stach, and R. H. Olsson III "Ferroelectric switching in sub-20 nm aluminum scandium nitride thin films," IEEE Electron Device Letters 41, 1774-1777 (2020).

[30] D. Wang, P. Musavigharavi, J. Zheng, G. Esteves, X. Liu, M. M. A. Fiagbenu, E. A. Stach, D. Jariwala, and R. H. Olsson III, "Sub-Microsecond Polarization Switching in (Al,Sc)N Fenoelectric Capacitors Grown on Complementary Metal-Oxide-Semiconductor-Compatible Aluminum Electrodes," physica status solidi (RRL)—Rapid Research Letters, 2000575 (2021).

What is claimed:

1. An optical component having nonlinear characteristics, the optical component comprising:
a first substrate defining a refractive index;
a nonlinear layer,
the nonlinear layer disposed on the first substrate,
the nonlinear layer comprising an amount of scandium (Sc), and
the nonlinear layer defining a refractive index that is higher than the refractive
index of the first substrate; and
a dielectric layer defined atop the nonlinear layer, wherein the dielectric layer comprises amorphous silicon.

2. The optical component of claim 1, wherein the nonlinear layer comprises AlScN.

3. The optical component of claim 1, wherein the nonlinear layer comprises up to about 40 mol % Sc.

4. The optical component of claim 3, wherein the nonlinear layer comprises up to about 35% Sc.

5. The optical component of claim 4, wherein the nonlinear layer comprises up to about 30% Sc.

6. The optical component of claim 5, wherein the nonlinear layer comprises up to about 20% Sc.

7. The optical component of claim 1, wherein the nonlinear layer defines a d33 value in the range of from about 0.1 to about 100 pm/V.

8. The optical component of claim 1, wherein the nonlinear layer defines a d31 value in the range of from about 0.01 to about 100 pm/V.

9. The optical component of claim 1, wherein the nonlinear layer defines an RMS roughness (Rq) of less than about 3 nm.

10. The optical component of claim 1, wherein the nonlinear layer defines an average roughness (Ra) of less than about 3 nm.

11. The optical component of claim 1, wherein the nonlinear layer defines an x-ray diffraction full width at half maximum (XRD FWHM) of up to about 2.5 deg.

12. The optical component of claim 1, wherein the nonlinear layer defines a refractive index at 1550 nm of from about 2 to about 2.4.

13. The optical component of claim 1, wherein the nonlinear layer defines a thickness in the range of from about 10 to about 3000 nm.

14. The optical component of claim 1, wherein the first substrate comprises Si, SiC, SiN, or $Al_2O_3$.

15. The optical component of claim 1, wherein the dielectric layer defines a refractive index, the refractive index of the dielectric layer being lower than the refractive index of the nonlinear layer.

16. The optical component of claim 1, wherein the dielectric layer defines (a) a thickness of up to about 200 nm, (b) a width of up to about 2 micrometers, or both (a) and (b).

17. The optical component of claim 1, wherein the dielectric layer defines a guided mode of any polarization and order within the nonlinear layer, such that light is primarily localized to the dielectric layer laterally and to the dielectric layer and nonlinear material vertically.

18. The optical component of claim 1, further comprising a buffer surmounting the dielectric layer and surmounting the nonlinear layer.

19. The optical component of claim 1, further comprising a signal electrode in electrical communication with the nonlinear layer.

20. The optical component of claim 1, further comprising a ground electrode in electrical communication with the nonlinear layer.

21. The optical component of claim 1, wherein the nonlinear layer or dielectric layer defines a closed curve.

22. The optical component of claim 1, wherein the nonlinear layer or dielectric layer defines a linear segment, a Y-branch, a grating coupler, or an edge coupler.

23. The optical component of claim 1, wherein the component is configured as a frequency converter, a multiple wavelength source, or a modulator.

24. The optical component of claim 1, wherein the optical component is defined on a single chip.

25. A method, comprising:
operating an optical component according to claim 1 so as to effect a signal from the optical component.

26. A method, comprising
fabricating an optical component according to claim 1, wherein the nonlinear layer is placed on the first substrate via vapor deposition.

* * * * *

UNITED STATES PATENT AND TRADEMARK OFFICE
CERTIFICATE OF CORRECTION

| | | |
|---|---|---|
| PATENT NO. | : 12,117,713 B2 | |
| APPLICATION NO. | : 17/877120 | |
| DATED | : October 15, 2024 | |
| INVENTOR(S) | : Valerie J. Yoshioka et al. | |

It is certified that error appears in the above-identified patent and that said Letters Patent is hereby corrected as shown below:

In the Specification

Under Column no. 1, Line nos. 17-18, Replace:
"Foundation, W91 INF-19-1-0087"
With:
--Foundation, W911NF-19-1-0087--

Under Column no. 2, Line no. 5, Replace:
"FIGS. 1A-ID provide"
With:
--FIGS. 1A-1D provide--

Under Column no. 2, Line no. 5, Replace:
"example FO modulator design,"
With:
--example EO modulator design.--

Under Column no. 2, Line no. 27, Replace:
"The SI-IG is"
With:
--The SHG is--

Under Column no. 2, Line no. 38, Replace:
"0% Se sample"
With:
--0% Sc sample--

Under Column no. 3, Line no. 4, Replace:
"10% Se is"

Signed and Sealed this
Fourteenth Day of January, 2025

Derrick Brent
*Acting Director of the United States Patent and Trademark Office*

With:
--10% Sc is--

Under Column no. 3, Line no. 34, Replace:
"600 am by"
With:
--600 nm by--

Under Column no. 3, Line no. 51, Replace:
"$Al_{0.80}Sc_{0.20}N$ sapphire."
With:
--$Al_{0.80}Sc_{0.20}N$ on sapphire.--

Under Column no. 5, Line no. 47, Replace:
"of Whether the"
With:
--of whether the--

Under Column no. 5, Line no. 64, Replace:
"Intergrated frequency"
With:
--Integrated frequency--

Under Column no. 6, Line no. 1, Replace:
"generation (DM), optical"
With:
--generation (DFM), optical--

Under Column no. 6, Line no. 21, Replace:
"frequency shifts cascaded"
With:
--frequency shifts; cascaded--

Under Column no. 7, Line nos. 44-45, Replace:
"invention. Similarly thickness"
With:
--invention. Similarly, thickness--

Under Column no. 8, Line no. 35, Replace:
"20 scan. The"
With:
--20 sccm. The--

Under Column no. 9, Line no. 23, Replace:
"Fresnel equations complete"

CERTIFICATE OF CORRECTION (continued)
U.S. Pat. No. 12,117,713 B2

With:
--Fresnel equations; complete--

Under Column no. 9, Line no. 57, Replace:
"reflected SI-IG from"
With:
--reflected SHG from--

Under Column no. 10, Line no. 42, Replace:
"substitutional Se is"
With:
--substitutional Sc is--

Under Column no. 10, Line no. 58, Replace:
"the Pockets coefficient"
With:
--the Pockels coefficient--

Under Column no. 10, Line no. 61, Replace:
"stronger Pockets effect"
With:
--stronger Pockels effect--

Under Column no. 10, Line no. 62, Replace:
"efficient FO modulators"
With:
--efficient EO modulators--

Under Column no. 11, Line no. 41, Replace:
"poling in thin"
With:
--poling in $Al_{1-x}Sc_xN$ thin--

Under Column no. 11, Line no. 43, Replace:
"processes to films"
With:
--processes to $Al_{1-x}Sc_xN$ films--

Under Column no. 12, Line no. 43, Replace:
"roughness ($R_q$) of"
With:
--roughness ($R_a$) of--

Under Column no. 13, Line no. 15, Replace:
"nonlinear laver."

With:
--nonlinear layer.--

Under Column no. 13, Line no. 27, Replace:
"to firm a closed"
With:
--to form a closed--

Under Column no. 13, Line no. 56, Replace:
"Schuck, H, Jung. R."
With:
--Schuck, H. Jung, R.--

Under Column no. 13, Line no. 63, Replace:
"X. Han. Z."
With:
--X. Han, Z.--

Under Column no. 13, Line no. 64, Replace:
"X. Tang. "Super""
With:
--X. Tang, "Super--

Under Column no. 14, Line no. 1, Replace:
"X. Guo. D."
With:
--X. Guo, D.--

Under Column no. 14, Line no. 25, Replace:
"X. Lu. C."
With:
--X. Lu, C.--

Under Column no. 14, Line no. 63, Replace:
"K. Kano. A."
With:
--K. Kano, A.--

Under Column no. 15, Line no. 1, Replace:
"G., Krishnatnurthy, A."
With:
--G., Krishnamurthy, A.--

Under Column no. 15, Line no. 2, Replace:
"H. Kohistedt, L."

CERTIFICATE OF CORRECTION (continued)
U.S. Pat. No. 12,117,713 B2

With:
--H. Kohlstedt, L.--

Under Column no. 15, Line no. 7, Replace:
"Shoji, I. Kondo, A. Kitatnoto,"
With:
--Shoji, T. Kondo, A. Kitamoto,--

Under Column no. 15, Line no. 24, Replace:
"B. Pati, and"
With:
--B. Potì, and--

Under Column no. 15, Line no. 37, Replace:
"2020 Conjerence on"
With:
--2020 Conference on--

Under Column no. 15, Line no. 38, Replace:
"Electro-Opties (CLEO)"
With:
--Electro-Optics (CLEO)--

Under Column no. 15, Line no. 43, Replace:
"S. Ilasuoka, T."
With:
--S. Yasuoka, T.--

Under Column no. 15, Line no. 49, Replace:
"C. Toucher, S."
With:
--C. Foucher, S.--

Under Column no. 15, Line no. 56, Replace:
"(Al,Sc)N Fenoelectric Capacitors"
With:
--(Al,Sc)N Ferroelectric Capacitors--

In the Claims

Under Column no. 16, Claim 2, Line no. 7, Replace:
"comprises AlScN."
With:
--comprises AlScN."--

Under Column no. 16, Claim 7, Line no. 17, Replace:
"defines a d33 value"
With:
--defines a $d_{33}$ value"--

Under Column no. 16, Claim 8, Line no. 20, Replace:
"defines a d31 value"
With:
--defines a $d_{31}$ value"--

Under Column no. 17, Claim 26, Line no. 6, Replace:
"A method, comprising"
With:
--A method, comprising:"--